US007280985B2

(12) United States Patent
Vasilescu

(10) Patent No.: US 7,280,985 B2
(45) Date of Patent: *Oct. 9, 2007

(54) LOGIC ARRANGEMENT, DATA STRUCTURE, SYSTEM AND METHOD FOR MULTILINEAR REPRESENTATION OF MULTIMODAL DATA ENSEMBLES FOR SYNTHESIS, RECOGNITION AND COMPRESSION

(75) Inventor: Manuela O. Vasilescu, Seaford, NY (US)

(73) Assignee: New York University, New York, NY (US)

( * ) Notice: Subject to any disclaimer, the term of this patent is extended or adjusted under 35 U.S.C. 154(b) by 567 days.

This patent is subject to a terminal disclaimer.

(21) Appl. No.: 10/498,279

(22) PCT Filed: Dec. 6, 2002

(86) PCT No.: PCT/US02/39257

§ 371 (c)(1),
(2), (4) Date: Jun. 4, 2004

(87) PCT Pub. No.: WO03/055119

PCT Pub. Date: Jul. 3, 2003

(65) Prior Publication Data

US 2005/0210036 A1 Sep. 22, 2005

Related U.S. Application Data

(60) Provisional application No. 60/402,374, filed on Aug. 9, 2002, provisional application No. 60/383,300, filed on May 23, 2002, provisional application No. 60/337,912, filed on Dec. 6, 2001.

(51) Int. Cl.
*G06F 15/18* (2006.01)

(52) U.S. Cl. .................................................. 706/1
(58) Field of Classification Search ............... 706/1, 706/20; 707/100
See application file for complete search history.

(56) References Cited

U.S. PATENT DOCUMENTS

| 5,493,682 | A | | 2/1996 | Tyra et al. |
| 5,740,425 | A | * | 4/1998 | Povilus .................. 707/100 |
| 5,784,294 | A | * | 7/1998 | Platt et al. ............... 702/27 |
| 5,794,256 | A | | 8/1998 | Bennett et al. |

(Continued)

OTHER PUBLICATIONS

Multilinear independent components analysis Vasilescu, M.A.O.; Terzopoulos, D.; Computer Vision and Pattern Recognition, 2005. CVPR 2005. IEEE Computer Society Conference on vol. 1, Jun. 20-25, 2005 pp. 547-553 vol. 1.*

(Continued)

*Primary Examiner*—Joseph P Hirl
*Assistant Examiner*—Michael B. Holmes
(74) *Attorney, Agent, or Firm*—Dorsey & Whitney LLP

(57) ABSTRACT

A data structure, method, storage medium and logic arrangement are provided for use in collecting and analyzing multilinear data describing various characteristics of different objects. In particular it is possible to recognize an unknown individual, an unknown object, an unknown action being performed by an individual, an unknown expression being formed by an individual, as well as synthesize a known action never before recorded as being performed by an individual, synthesize an expression never before recorded as being formed by an individual, an reduce the amount of stored data describing an object or action by using dimensionality reduction techniques, and the like.

137 Claims, 15 Drawing Sheets

U.S. PATENT DOCUMENTS

| | | | | |
|---|---|---|---|---|
| 5,845,285 | A | * | 12/1998 | Klein ................... 707/101 |
| 5,870,749 | A | | 2/1999 | Adusumilli |
| 5,974,416 | A | * | 10/1999 | Anand et al. ............ 707/10 |
| 5,974,418 | A | * | 10/1999 | Blinn et al. ............ 707/100 |
| 6,003,038 | A | * | 12/1999 | Chen ................... 707/103 R |
| 6,029,169 | A | | 2/2000 | Jenkins |
| 6,105,041 | A | | 8/2000 | Bennett et al. |
| 6,349,265 | B1 | * | 2/2002 | Pitman et al. ............ 702/27 |
| 6,381,507 | B1 | | 4/2002 | Shima et al. |
| 6,408,321 | B1 | * | 6/2002 | Platt ................... 708/520 |
| 6,510,433 | B1 | * | 1/2003 | Sharp et al. ............ 707/100 |
| 6,549,943 | B1 | | 4/2003 | Spring |
| 6,591,004 | B1 | * | 7/2003 | VanEssen et al. ......... 382/154 |
| 6,631,364 | B1 | * | 10/2003 | Rioux et al. ............ 707/2 |
| 7,085,426 | B2 | * | 8/2006 | August .................. 382/260 |
| 7,130,484 | B2 | * | 10/2006 | August .................. 382/266 |

OTHER PUBLICATIONS

Model-based and image-based methods for facial image synthesis, analysis and recognition Terzopoulos, D.; Yuencheng Lee; Vasilescu, M.A.O.; Automatic Face and Gesture Recognition, 2004. Proceedings. Sixth IEEE International Conference on May 17-19, 2004 pp. 3-8.*

Multilinear subspace analysis of image ensembles Vasilescu, M.A. O.; Terzopoulos, D.; Computer Vision and Pattern Recognition, 2003. Proceedings. 2003 IEEE Computer Society Conference on vol. 2, Jun. 18-20, 2003 pp. II-93-II-99 vol. 2.*

Human motion signatures: analysis, synthesis, recognition Vasilescu, M.A.O.; Pattern Recognition, 2002. Proceedings. 16th International Conference on vol. 3, Aug. 11-15, 2002 pp. 456-460 vol. 3.*

Multilinear image analysis for facial recognition Vasilescu, M.A.O.; Terzopoulos, D.; Pattern Recognition, 2002. Proceedings. 16th International Conference on vol. 2, Aug. 11-15, 2002 pp. 511-514 vol. 2.*

Sampling and reconstruction with adaptive meshes Terzopoulos, D.; Vasilescu, M.; Computer Vision and Pattern Recognition, 1991. Proceedings CVPR '91., IEEE Computer Society Conference on Jun. 3-6, 1991 pp. 70-75.*

Adaptive meshes and shells: irregular triangulation, discontinuities, and hierarchical subdivision Vasilescu, M.; Terzopoulos, D.; Computer Vision and Pattern Recognition, 1992. Proceedings CVPR '92., 1992 IEEE Computer Society Conference on Jun. 15-18, 1992 pp. 829-832.*

Succi et al., "A Taxonomy for Identifying a Software Component from Uncertain and Partial Specifications," ACM, Symposium on Applied Computing, pp. 570-579, 1996.

Colnet et al., "Compiler Support to Customize the Mark and Sweep Algorithm," ACM, International Symposium on Memory Management, pp. 154-165, 1998.

Baruchelli et al., "A Fuzzy Approach to Faceted Classification and Retrieval of Reusable Software Components," ACM, SIGAPP Applied Computing Review, vol. 5, Issue 1, pp. 15-20, Spring 1997.

Hassen et al., "A Flexible Operation Execution Model for Shared Distributed Objects," ACM, Conference on Object Oriented Programming Systems Language and Applications, pp. 30-50, 1996.

O'Connell et al., "Optimizer and Parallel Engine Extensions for Handling Expensive Methods Based on Large Objects, Data Engineering," IEEE, Proceedings 15th International Conference, pp. 304-313, 1999.

* cited by examiner

208

1200

1250

1210

1260

1220

1270

1304

LOGIC ARRANGEMENT, DATA STRUCTURE, SYSTEM AND METHOD FOR MULTILINEAR REPRESENTATION OF MULTIMODAL DATA ENSEMBLES FOR SYNTHESIS, RECOGNITION AND COMPRESSION

CROSS REFERENCE TO RELATED APPLICATIONS

The present application claims priority from U.S. patent application Ser. Nos. 60/337,912 filed Dec. 6, 2001, 60/383,300 filed May 23, 2002 and 60/402,374 filed Aug. 9, 2002, the entire disclosures of which are incorporated herein by reference.

FIELD OF THE INVENTION

The present invention relates generally to a logic arrangement, data structure, system and method for acquiring data, and more particularly to a logic arrangement, data structure, system and method for acquiring data describing at least one characteristic of an object, synthesizing new data, recognizing acquired data and reducing the amount of data describing one or more characteristics of the object (e.g., a human being).

BACKGROUND OF THE INVENTION

Natural images are the composite consequence of multiple factors related to scene structure, illumination and imaging. Human perception of natural images remains robust despite significant variation of these factors. For example, people possess a remarkable ability to recognize faces given a broad variety of facial geometries, expressions, head poses and lighting conditions.

Some past facial recognition systems have been developed with the aid of linear models such as principal component analysis ("PCA"), independent component analysis ("ICA"). Principal components analysis ("PCA") is a popular linear technique that has been used in past facial image recognition systems and processes. By their very nature, linear models work best when a single-factor varies in an image formation. Thus, linear techniques for facial recognition systems perform adequately when person identity is the only factor permitted to change. However, if other factors (such as lighting, viewpoint, and expression) are also permitted to modify facial images, the recognition rate of linear facial recognition systems can fall dramatically.

Similarly, human motion is the composite consequence of multiple elements, including the action performed and a motion signature that captures the distinctive pattern of movement of a particular individual. Human recognition of particular characteristics of such movement can be robust even when these factors greatly vary. In the 1960's, the psychologist Gunnar Kohansson performed a series of experiments in which lights were attached to people's limbs, and recorded a video of the people performing different activities (e.g., walking, running and dancing). Observers of these moving light videos in which only the lights are visible were asked to classify the activity performed, and to note certain characteristics of the movements, such as a limp or an energetic/tired walk. It was observed that this task can be performed with ease, and that the observer could sometimes determine even recognize specific individuals in this manner. This may coraborate the idea that the motion signature is a perceptible element of human motion and that the signature of a motion is a tangible quantity that can be separated from the actual motion type.

However, there is a need to overcome at least some of the deficiencies of the prior art techniques.

OBJECTS AND SUMMARY OF THE INVENTION

Such need is addressed by the present invention. One of the objects of the present invention is to provide a logic arrangement, data structure, storage medium, system and method for generating an object descriptor. According to an exemplary embodiment of the present invention such data structure can include a plurality of first data elements that have information regarding at least one characteristic of the at least one object. The information of the first data elements is capable of being used to obtain the object descriptor. The object descriptor is related to the at least one characteristic and a further characteristic of the at least one object, and is capable of being used to generate a plurality of second data elements which contain information regarding the further characteristic of the at least one object based on the object descriptor.

In another exemplary embodiment of the present invention, the method can include a plurality of first data elements containing information regarding at least one characteristic of the at least one object. The object descriptor is obtained based on the information of the first data elements and is related to the at least one characteristic and a further characteristic of the object. A plurality of second data elements containing information regarding the further characteristic of the at least one object based on the object descriptor.

In still another exemplary embodiment of the present invention, the storage medium including a software program, which when executed by a processing arrangement, is configured to cause the processing arrangement to execute a series of steps. The series of steps can include a plurality of first data elements containing information regarding at least one characteristic of the at least one object. The object descriptor is obtained based on the information of the first data elements and is related to the at least one characteristic and a further characteristic of the object. A plurality of second data elements containing information regarding the further characteristic of the at least one object based on the object descriptor.

In a further exemplary embodiment of the present invention, the logic arrangement is adapted for an execution by a processing arrangement to perform a series of steps. The series of steps can include a plurality of first data elements containing information regarding at least one characteristic of the at least one object. The object descriptor is obtained based on the information of the first data elements and is related to the at least one characteristic and a further characteristic of the object. A plurality of second data elements containing information regarding the further characteristic of the at least one object based on the object descriptor.

Another of the objects of the present invention is to provide a logic arrangement, data structure, storage medium, system and method for identifying a sample object of a plurality of objects based upon a sample object descriptor.

According to an exemplary embodiment of the present invention such data structure can include a plurality of first data elements that have information which is defined by at least two first primitives. The first data elements are capable of being used to obtain at least one of a plurality of object descriptors. The exemplary data structure may also include a plurality of second data elements that have information which is defined by at least two second primitives. The second data elements are capable of being used to obtain the sample object descriptor. The at least one obtained object descriptor configured to be compared to the sample object descriptor for determining whether the object is potentially identifiable as one of the object descriptors. Each of the plurality of object descriptors is associated with a respective one of a plurality of objects.

In another exemplary embodiment of the present invention, the method can include a plurality of data elements which are defined by at least two primitives are collected. At least one of a plurality of object descriptors are obtained based on the information of the data elements. The sample object descriptor is compared to at least one of the object descriptors for determining whether the sample object descriptor is identifiable as one of the object descriptors. Each of the object descriptors is associated with a respective one of a plurality of objects.

In still another exemplary embodiment of the present invention, the storage medium including a software program, which when executed by a processing arrangement, is configured to cause the processing arrangement to execute a series of steps. The series of steps can include can include a plurality of data elements which are defined by at least two primitives are collected. At least one of a plurality of object descriptors are obtained based on the information of the data elements. The sample object descriptor is compared to at least one of the object descriptors for determining whether the sample object descriptor is identifiable as one of the object descriptors. Each of the object descriptors is associated with a respective one of a plurality of objects.

In a further exemplary embodiment of the present invention, the logic arrangement is adapted for an execution by a processing arrangement to perform a series of steps. The series of steps can include a plurality of data elements which are defined by at least two primitives are collected. At least one of a plurality of object descriptors are obtained based on the information of the data elements. The sample object descriptor is compared to at least one of the object descriptors for determining whether the sample object descriptor is identifiable as one of the object descriptors. Each of the object descriptors is associated with a respective one of a plurality of objects.

Yet another of the objects of the present invention is to provide a logic arrangement, data structure, storage medium, system and method for reducing the dimensionality of one of the at least two object descriptors. According to an exemplary embodiment of the present invention such data structure can include a plurality of data elements that have information defined by at least two primitives. The data elements are capable of being used to obtain one of the object descriptors. The one of the object descriptors is capable having a reduced dimensionality.

In another exemplary embodiment of the present invention, the method can include a plurality of data elements defined by at least two primitives are collected. The one of the object descriptors based on the information of the data elements is obtained. The dimensionality of the one of the object descriptors is reduced.

In still another exemplary embodiment of the present invention, the storage medium including a software program, which when executed by a processing arrangement, is configured to cause the processing arrangement to execute a series of steps. The series of steps can include can include a plurality of data elements defined by at least two primitives are collected. The one of the object descriptors based on the information of the data elements is obtained. The dimensionality of the one of the object descriptors is reduced.

In a further exemplary embodiment of the present invention, the logic arrangement is adapted for an execution by a processing arrangement to perform a series of steps. The series of steps can include a plurality of data elements defined by at least two primitives are collected. The one of the object descriptors based on the information of the data elements is obtained. The dimensionality of the one of the object descriptors is reduced.

BRIEF DESCRIPTION OF THE DRAWINGS

Further objects, features and advantages of the invention will become apparent from the following detailed description taken in conjunction with the accompanying figures showing illustrative embodiments of the invention, in which.

Figure 1:
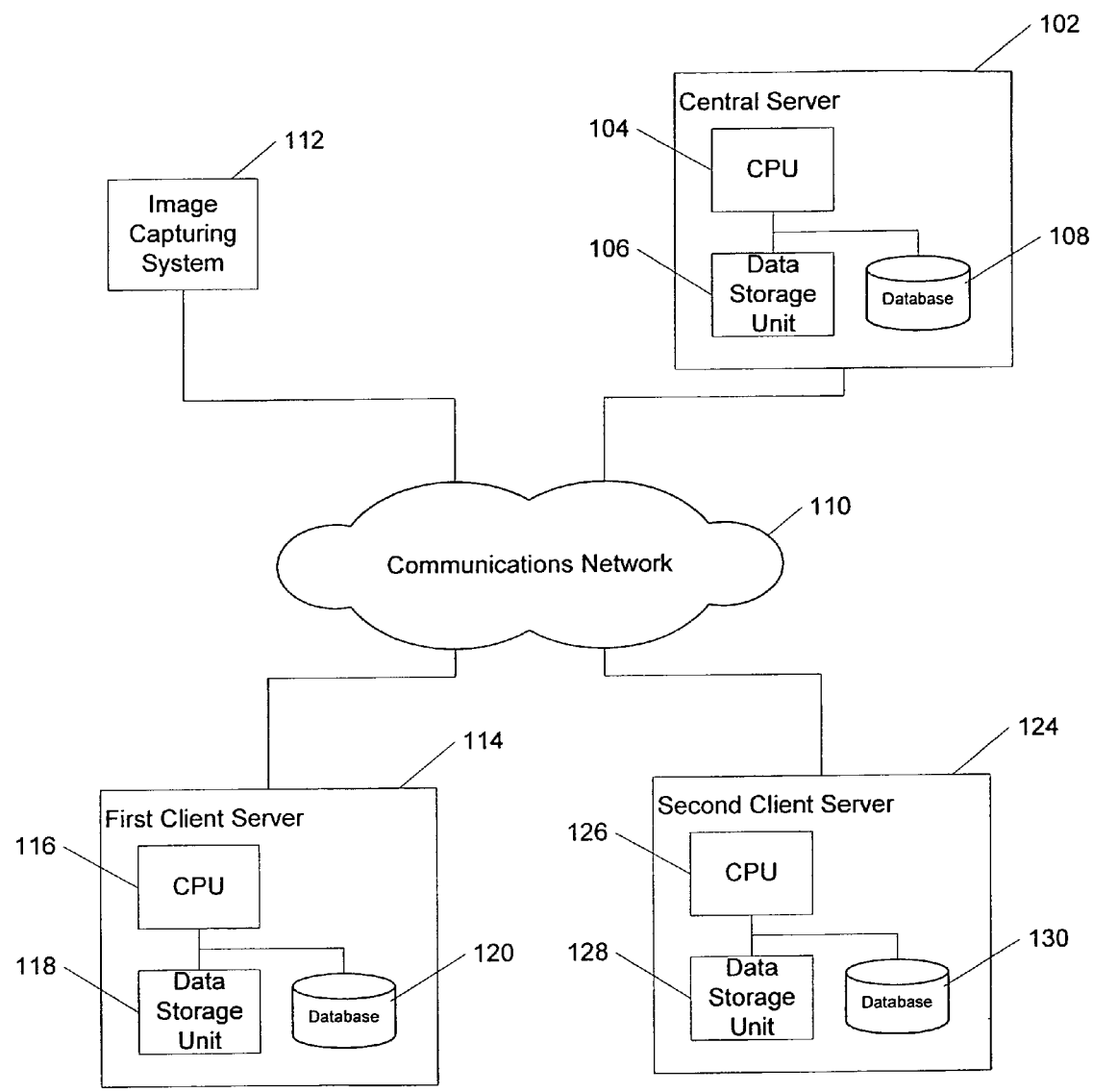
FIG. 1 is a block diagram of a data analysis system according to an exemplary embodiment of the present invention.

Throughout the figures, the same reference numerals and characters, unless otherwise stated, are used to denote like features, elements, components or portions of the illustrated embodiments. Moreover, while the present invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF PREFERRED EMBODIMENTS

FIG. 1 illustrates an exemplary embodiment of a data analysis system 100 for use in the collection and analysis of data describing various characteristics of different objects. In this embodiment, a central server 102 is provided in the system 100, which provides therein a central processing unit ("CPU") 104, a data storage unit 106 and a database 108. The central server 102 is connected to a communications network 110, which is in turn connected to an data capturing system 112. The data capturing system 112 can include at least one camera (not shown for the sake of clarity). A first client server 114 is provided in the system 100, which provides therein a CPU 116, a data storage unit 118, and a database 120. The first client server 114 is connected to the communications network 110. A second client server 124 is also provided in the system 100, which situates a CPU 126, a data storage unit 128, and a database 130. The second client server 124 is also connected to the communications network 110. It should be understood that the central server 102, the image capture system 112, the first client server 114 and the second client server 124 can forward data messages to each other over the communications network 110.

In a preferred embodiment of the present invention, the data capturing system 112 can be a "VICON" system which employs at least four video cameras. The VICON system can be used to capture human limb motion and the like.

A multilinear data analysis application can be stored in the data storage unit 106 of the central server 102. This multilinear data analysis application is capable of recognizing an unknown individual, an unknown object, an unknown action being performed by an individual, an unknown expression, an unknown illumination, an unknown viewpoint, and the like. Such application can also synthesize a known action that has never before recorded as being performed by an individual, as well as an expression which has previously not been recorded as being formed by an individual. Further the application can reduce the amount of stored data that describes an object or action by using dimensionality reduction techniques, and the like. It should be understood that dimensionality reduction is equivalent to compression and data reduction. The multilinear data analysis application preferably utilizes a corpus of data, which is collected using the data capturing system 112 from different subjects. The corpus of data is stored in the database 108 of the server 102, and can be organized as a tensor D, which shall be described in further detail as follows.

A tensor, also known as an n-way array or multidimensional matrix or n-mode matrix, is a higher order generalization of a vector (first order tensor) and a matrix (second order tensor). A tensor can be defined as a multi-linear mapping over a set of vector spaces. The tensor can be represented in the following manner: $A \in IR^{I_1 \times I_2 \times \cdots \times I_N}$ where A is a tensor. The order of the tensor A is N. A tensor is formed by a group of primatives. Each primative is a set of mode vectors, such that a first primative is a set of mode-1 vectors, a second vector is a set of mode-2 vectors, an $n^{th}$ primative is a set of mode-n vectors, etc. In an alternate embodiment, the primatives can be row vectors of a matrix, column vectors of a matrix, index of a vector, etc. An element of tensor A is denoted as $A_{i_1 \ldots i_n \ldots i_N}$ or $a_{i_1 \ldots i_n \ldots i_N}$ or where $1 \leq i_n \leq I_n$. Scalars are denoted by lower case letters (a, b, . . . ), vectors by bold lower case letters (a, b . . . ), matrices by bold upper-case letters (A, B . . . ), and higher-order tensors by italicized bolded upper-case letters (A, B . . . ).

In tensor terminology, column vectors are referred to as mode-1 vectors, and row vectors are referred to as mode-2 vectors. Mode-n vectors of an $N^{th}$ order tensor $A \in IR^{I_1 \times I_2 \times \cdots \times I_N}$ are the $I_n$-dimensional vectors obtained from the tensor A by varying index $i_n$ while maintaining the other indices as fixed. The mode-n vectors are the column vectors of matrix $A_{(n)} \in IR^{I_n \times (I_1 I_2 \cdots I_{n-1} I_{n+1} \cdots I_N)}$ that can result from flattening the tensor A, as shown in FIGS. 12A-12F. The flattening procedure shall be described in further detail below. The n-rank of tensor $A \in IR^{I_1 \times I_2 \times \cdots \times I_N}$, denoted $R_n$, is defined as the dimension of the vector space generated by the mode-n vectors:

$$R_n = \text{rank}_n(A) = \text{rank}(A_{(n)}).$$

Figure 12A:
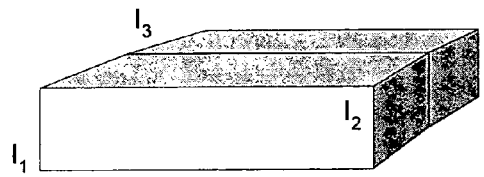
FIGS. 12A-12F are block diagrams of sample tensors and equivalent mode-1, mode-2 and mode-3 flattened tensors according to an exemplary embodiment of the present invention.
Figure 12D:
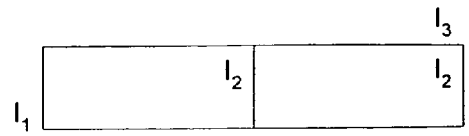
Figure 12B:
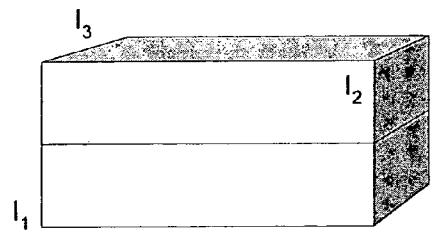
Figure 12E:
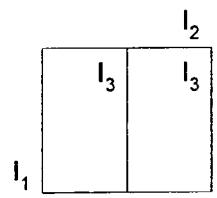
Figure 12C:
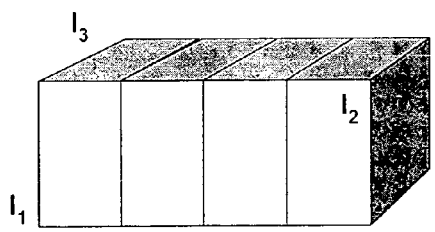
Figure 12F:
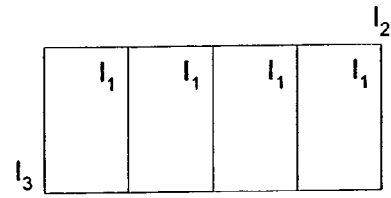

FIGS. 12A-12C show third order tensors 1200, 1210, 1220, respectively, each having dimensions $I_1 \times I_2 \times I_3$. FIG. 12D shows the third order tensor 1200 after having been mode-1 flattened to obtain a matrix 1250 containing mode-1 vectors of the third order tensor 1200. The third order tensor 1200 of FIG. 12A is a cube type structure, while the matrix 1250 is a two dimensional type structure having one index, i.e., $I_2$, imbedded (to a certain degree) within the matrix 1250. FIG. 12E shows a matrix 1260 containing mode-2 vectors of the third order tensor 1210 after it has been mode-2 flattened. This third order tensor 1210 is a cube type structure, while the matrix 1260 is a two dimensional type structure having one index, e.g., $I_3$, imbedded (to a certain degree) with the data. FIG. 12F shows the third order tensor 1220 after having been mode-3 flattened to obtain a matrix 1270 containing mode-3 vectors of the third order tensor 1220. Such third order tensor 1220 is a cube type structure, while the matrix 1270 organizes is a two dimensional type structure having one index, e.g., $I_1$, imbedded (to a certain degree) with the data.

A generalization of the product of two matrices can be the product of the tensor and matrix. The mode-n product of tensor $A \in IR^{I_1 \times I_2 \times \cdots \times I_n \times \cdots \times I_N}$ by a matrix $M \in IR^{J_n \times I_n}$, denoted by $A \times_n M$, is a tensor $B \in IR^{I_1 \times \cdots \times I_{n-1} \times J_n \times I_{n+1} \times \cdots \times I_N}$, whose entries are $B_{i_1 \ldots i_{n-1} j_n i_{n+1} \ldots i_N} = \Sigma_{i_n} a_{i_1 \ldots i_{n-1} i_n i_{n+1} \ldots i_N} m_{j_n i_n}$. The entries of the tensor B are computed by $$(A \times_n M)_{i_1 \ldots i_{n-1} j_n i_{n+1} \ldots i_N} = \sum_{i_n} a_{i_1 \ldots i_{n-1} i_n i_{n+1} \ldots i_N} m_{j_n i_n}.$$

The mode-n product can be expressed as $B = A \times_n M$, or in terms of flattened matrices as $B_{(n)} = M A_{(n)}$. The mode-n product of a tensor and a matrix is a special case of the inner product in multilinear algebra and tensor analysis. The mode-n product is often denoted using Einstein summation notation, but for purposes of clarity, the mode-n product symbol will be used. The mode-n product has the following properties:

1. Given a tensor $A \in \mathbb{R}^{I_1 \times \cdots \times I_n \times \cdots \times I_m \cdots}$ and two matrices, $U \in \mathbb{R}^{J_m \times I_m}$ and $V \in \mathbb{R}^{J_n \times I_n}$ the following property holds true:

$$A \times_m U \times_n V = (A \times_m U) \times_n V$$
$$= (A \times_n V) \times_m U$$
$$= A \times_n V \times_m U$$

2. Given a tensor $A \in \mathbb{R}^{I_1 \times \cdots \times I_n \times \cdots \times I_N}$ and two matrices, $U \in \mathbb{R}^{J_n \times I_n}$ and $V \in \mathbb{R}^{K_n \times J_n}$ the following property holds true:

$$(A \times_n U) \times_n V = A \times_n (VU)$$

An $N^{th}$-order tensor $A \in \mathbb{R}^{I_1 \times I_2 \times \cdots \times I_N}$ has a rank-1 when it is able to be expressed as the outer product of N vectors: $A = u_1 \circ u_2 \circ \ldots \circ u_N$. The tensor element is expressed as $a_{ij\ldots m} = u_{1i} u_{2j} \ldots u_{Nm}$, where $u_{1i}$ is the $i^{th}$ component of $u_1$, etc. The rank of a $N^{th}$ order tensor A, denoted R=rank(A), is the minimal number of rank-1 tensors that yield A in a linear combination:

$$A = \sum_{r=1}^{R} \sigma_r u_1^{(r)} \circ u_2^{(r)} \circ \ldots \circ u_N^{(r)}.$$

A singular value decomposition (SVD) can be expressed as a rank decomposition as is shown in the following simple example:

$$M = \begin{bmatrix} a & b \\ c & d \end{bmatrix} \begin{bmatrix} \sigma_{11} & 0 \\ 0 & \sigma_{22} \end{bmatrix} \begin{bmatrix} f & g \\ h & i \end{bmatrix}$$
$$= \sigma_{11} \begin{bmatrix} a \\ c \end{bmatrix} \circ \begin{bmatrix} f \\ g \end{bmatrix} + \sigma_{22} \begin{bmatrix} b \\ d \end{bmatrix} \circ$$
$$= U_1 \Sigma U_2^T$$
$$= [u_1^{(1)} \ u_1^{(2)}] \begin{bmatrix} \sigma_{11} & 0 \\ 0 & \sigma_{22} \end{bmatrix} [u_2^{(1)} \ u_2^{(2)}]^T$$
$$= \sum_{i=1}^{R=2} \sum_{j=1}^{R=2} \sigma_{ij} u_1^{(i)} \circ u_2^{(j)}$$

It should be noted that an SVD is a combinatorial orthogonal rank decomposition, but that the reverse is not true; in general, rank decomposition is not necessarily singular value decomposition. Also, the N-mode SVD can be expressed as an expansion of mutually orthogonal rank-1 tensors, as follows:

$$D = \sum_{i_1=1}^{R_1} \ldots \sum_{i_n=1}^{R_n} \ldots \sum_{i_N=1}^{R_N} \ldots z_{i_1 \ldots i_N} U_1^{(i_1)} \circ \ldots \circ U_n^{(i_n)} \circ \ldots U_N^{(i_N)},$$

where $U_n^{(in)}$ is the $i_n$ column vector of the matrix $U_n$. This is analogous to the equation $$\sum_{i=1}^{R=2} \sum_{j=1}^{R=2} \sigma_{ij} u_1^{(i)} \circ u_2^{(j)}.$$

A client interface application can be stored in the data storage units 118, 128 of the first and second client servers 114, 124, respectively. The client interface application preferably allows the user to control the multilinear data analysis application described previously. For example, the client interface application can instruct the multilinear data analysis application to generate new data describing a particular characteristic of a known object that may be different from those characteristics of the known object which were already observed. In addition, the client interface application can instruct the multilinear data analysis application to generate new data describing a particular characteristic of the remainder of the population of observed objects that are different from those characteristics of the remainder of the population already observed. Also, the client interface application can instruct the multilinear data analysis application to recognize an unknown object from the population of observed objects, recognize a characteristic of a known object from the characteristics of the known object already observed, dimensionally reduce the amount of data stored to describe a characteristic of a known object, etc. In one exemplary embodiment of the present invention, the object can be a person and the characteristic may be an action. In another embodiment of the present invention, the object could be a person's face, and the characteristic can be a facial expression. In response to the client interface application's instructions, the multilinear data analysis application may transmit to the client interface application certain information describing the requested characteristic or object.

A. Motion Signature Using a Tensor Representation of a Corpus of Data

Figure 2:
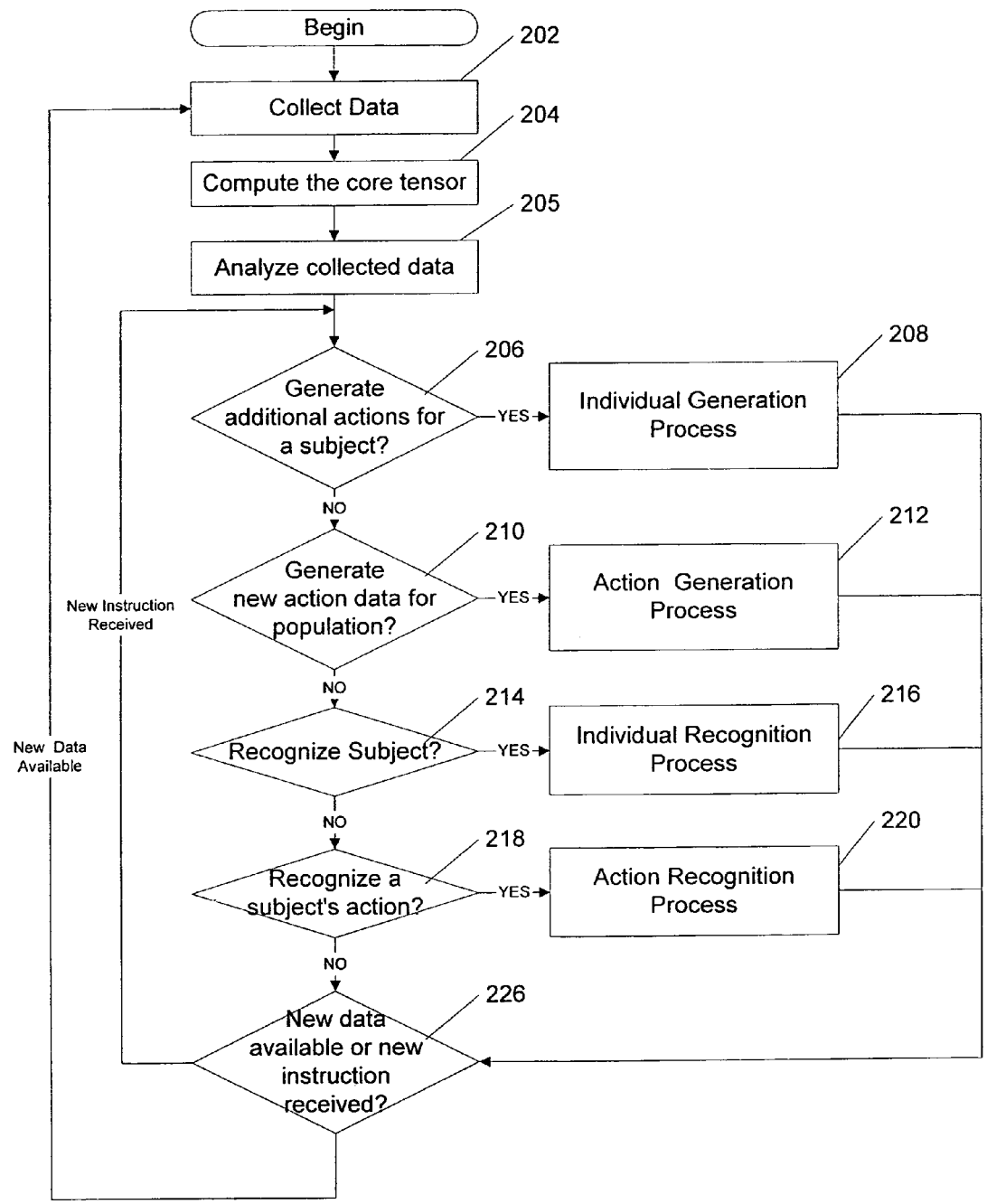
FIG. 2 is a flow diagram of an exemplary embodiment of a process according to the present invention which analyzes multilinear data.

FIG. 2 illustrates flow diagram of an exemplary embodiment of a process 200 which is indicative of the multilinear data analysis application. As described above for the multilinear data analysis application, the process 200 is configured to recognize the unknown subject or individual, recognize the unknown action being performed by the known subject, generate a known action never before recorded as being performed by the subject, etc. In particular the multilinear data analysis application utilizes the corpus of motion data, which is collected using the data capturing system 112 from different subjects. This corpus of motion information is stored in the database 108 of the server 102, and describes angles of the joints in the legs of at least one subject performing at least one action. The corpus of motion information can be organized as a tensor D. It should be understood that the corpus of motion information can also be organized as a matrix D or a vector d. For example, if the information is organized as a matrix D, the process 200 preferably remains the same, but the underlying tensor procedures could be converted to matrix procedure equivalents. It should also be noted that representing the data contained in the tensor D may integrate multiple indices into a singular matrix index. Likewise, if the information is organized as a vector d, the process 200 preferably remains the same, but the underlying tensor procedures could be converted to vector procedure equivalents. It should also be noted that representing the data contained in the tensor D may integrate multiple indices into a singular vector index.

The corpus of motion data is preferably collected from different subjects that perform at least one action which forms the tensor D. Each action can be repeated multiple times, and a motion cycle can be segmented from each motion sequence. For example, in order to suppress noise, the collected motion data can be passed through a low-pass fourth-order Butterworth filter at a cut off frequency of 6 Hz, and missing data may be interpolated with a cubic spline. Joint angles can be computed to represent the motion information of the limbs of various subjects (e.g., people). To compute the joint angles, the frame coordinate transformation for each limb may be calculated with respect to an area in which the motion information is collected, the relative orientation of each limb in the kinematic chain can then be determined, and the inverse kinematic equations are thus obtained. The joint angles are thereafter stored in the tensor D. Such tensor D can have the form of a $IR^{G \times M \times T}$, where G is the number of subjects, M is the number of action classes, and T is the number of joint angle time samples.

In an exemplary implementation of a preferred embodiment according to the present invention, three motions are collected for each person: e.g., walk, ascend-stairs, and descend stairs. In another exemplary implementation, each action can be repeated ten (10) times. In yet another exemplary implementation, human limb motion can be recorded using the VICON system that employs four infra-red video cameras. These cameras generally detect infra-red light which is reflected from 18 markers, 9 placed on each leg of a human subject. The system 112 then computes a three-dimensional position of the markers relative to a fixed coordinate frame. The video cameras can be positioned on one side of a 12 meter long walkway such that each marker can be observed by at least two cameras during the subject's motion. To extract the three angles spanned by a joint of the subject, a plane can be defined for each limb whose motion can be measured relative to the sagittal, frontal and transverse planes through the body of the subject. It should be noted that the joint angle time samples reflect the joint angles of various joints as they move over time.

Turning to further particulars of FIG. 2, in step 202, the process 200 collects motion information or data on various subjects (e.g., people) performing different actions, e.g., new motion data. The motion is collected as a group of vectors. Each of the group of vectors represents a subject performing an action. If each of the possible the actions and the individual are known, the data can be integrated into the tensor D. If the action or individual are not known, such data would likely not be integrated into the tensor D until those pieces of information are determined. The data describing an unknown action or individual is organized as a new data tensor $D_{p,a}$ of a new subject or a new data vector d of a new subject. The new data tensor $D_{p,a}$ includes more than one new data vector d. Each new data vector d of the new data tensor $D_{p,a}$ describes the motion of subject p performing action a.

At step 204, the process 200 solves for a core tensor Z which can be generally used for defining the inter-relationships between the orthonormal mode matrices. This step represents an N-mode singular value decomposition ("SVD") process 204, shown in FIG. 3, and described in further detail herein. It should be noted that the N-mode SVD procedure of step 204 is an orthonormal decomposition procedure. The N-mode SVD procedure of step 204 solves for the core tensor Z. When this procedure of step 204 determines the core tensor Z, the process 200 advances to step 205.

In an alternate embodiment of the present invention, an alternate n-mode orthonormal decomposition procedure is used in place of the n-mode SVD procedure.

In step 205, the process 200 analyzes the data collected in the step 202. With the knowledge of motion sequences of several subjects, the tensor D can take the form of a $IR^{G \times M \times T}$ tensor, where G is the number of subjects or people, M is the number of action classes, and T is the number of joint angle time samples. The N-mode SVD procedure of step 204 decomposes the tensor D into the product of a core tensor Z, and three orthogonal matrices as follows:

$$D = Z \times_1 P \times_2 A \times_3 J,$$

The subject matrix $P = [p_1 \ldots p_n \ldots p_G]^T$, whose subject-specific row vectors $p_n^T$ span the space of person parameters, encodes the per-subject invariance across actions. Thus, the matrix P contains the subject or human motion signatures. The action matrix $A = [a_1 \, a_m \, a_M]^T$, whose action specific row vectors $a_n^T$ span the space of action parameters, encodes the invariance for each action across different subjects. The joint angle matrix J whose row vectors which span the space of joint angles are preferably the eigenmotions, the motion variation.

The product $Z \times_3 J$ transforms the eigenmotions into tensormotions, a tensor representaion of the variation and co-variation of modes (subjects and action classes). The product $Z \times_3 J$ also characterizes how the subject's parameters and action parameters interact with one another. The tensor $$B = Z \times_2 A \times_3 J$$

is an action specific tensormotion, which contains a set of basis matrices for all the motions associated with particular actions. The tensor $$C = Z \times_1 P \times_3 J$$

is a subject/signature specific tensormotion, which preferably contains a set of basis matrices for all the motions associated with particular subjects (with particular subject motion signatures). The core tensor Z, the matrix A, and the matrix J generated by the N-mode SVD procedure of step 204 of the tensor D define a generative model.

In step 206, the process 200 determines whether it has been instructed by the client interface application to synthesize new data describing at least one known action that was never before recorded as being performed by a new subject. If the process 200 has received such instruction, step 208 is executed to perform advances to an individual generation procedure, as shown in further detail in FIG. 4 and described herein. When the individual generation procedure of step 208 is complete, the process 200 advances to step 226.

In step 210, the process 200 determines if it was instructed by the client interface application to synthesize new data describing a new action that was never before recorded as being performed by the remainder of the population of observed subjects. If the process 200 has received such instruction, the process 200 continues to an action generation procedure of step 212, as shown in further detail in FIG. 5 and described herein. When the action generation procedure of step 212 is completed, the process 200 is forwarded to step 226.

In step 214, the process 200 determines if it was instructed by the client interface application to recognize an unknown subject who has been observed to perform a known action as one of the population of observed known subjects. If the process 200 has received such instruction, the process 200 is directed to an individual recognition procedure of step 216, as shown in greater detail in FIG. 6 and described infra. Once the individual recognition process 216 is completed, the process 200 advances to step 226.

In a preferred embodiment, the process 200 is capable of recognizing an unknown subject who has been observed performing an unknown action as one of the population of observed known subjects.

Figure 7:
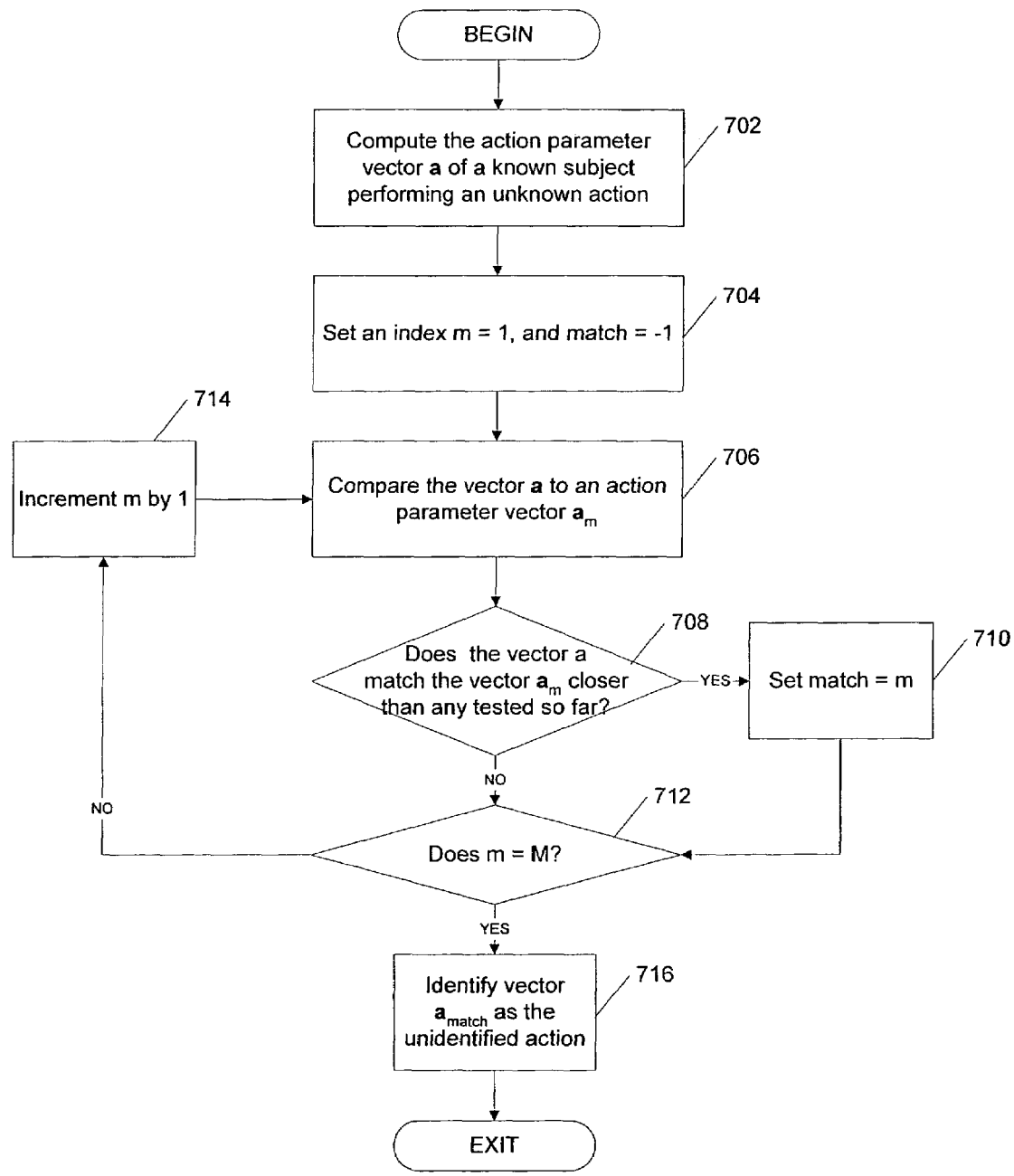
FIG. 7 is a flow diagram of an exemplary embodiment of an action recognition procedure of the process of FIG. 2 which recognizes an unknown action being performed by a known individual.

In step 218, the process 200 determines if it was instructed by client interface application to recognize an unknown action being performed by a known subject as one of the actions already observed as being performed by the known subject. If the process 200 has received such an instruction, the process 200 continues to an action recognition procedure of step 220, as shown in FIG. 7 and described infra. When the individual recognition procedure of step 220 is completed, the process 200 is forwarded to step 226. Then in step 226, the process 200 determines whether a data set for a new subject should be integrated into the tensor D or if the client interface application has transmitted a new instruction. In particular, if a data set for a new subject is available, the process 200 advances to step 202. Otherwise, the process 200 received the new instruction from the client interface application, so the process 200 continues to step 206.

Figure 3:
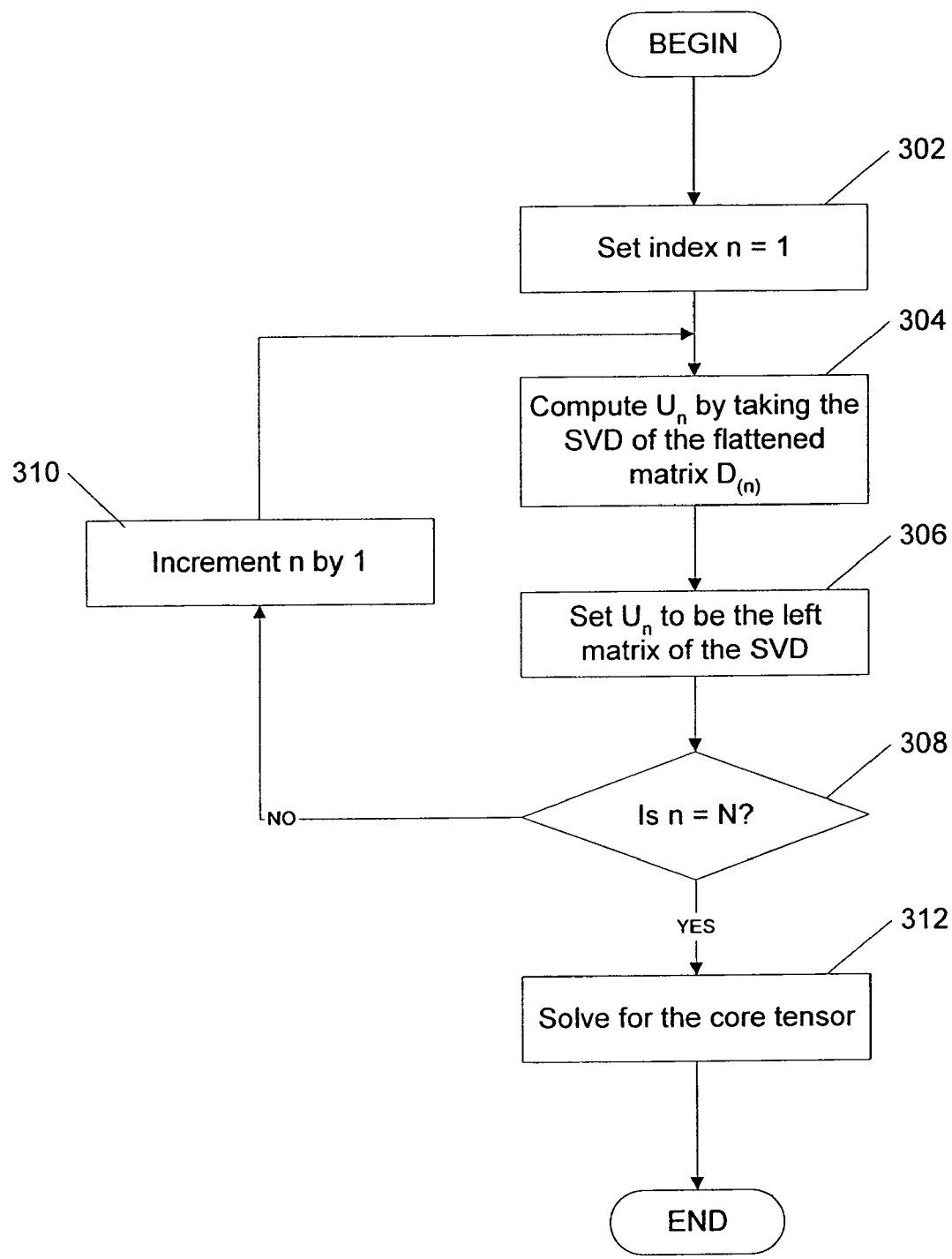
FIG. 3 is a flow diagram of an exemplary embodiment of a core tensor computation procedure of the process of FIG. 2 which performs an N-mode SVD algorithm for decomposing an N-dimensional tensor.

FIG. 3 illustrates the exemplary details N-mode SVD procedure of step 204 for performing an N-mode SVD algorithm to decompose the tensor D and compute the core tensor Z. The N-mode SVD procedure of step 204 is related to and grows out of a natural generalization of the SVD procedure for a matrix. For example, a matrix $D \in IR^{I_1 \times I_2}$ is a two-mode mathematical object that has two associated vector spaces, e.g., a row space and a column space. The SVD procedure for a matrix orthogonalizes these two spaces, and decomposes the matrix as $D = U_1 \Sigma U_2^T$, with the product of an orthogonal column-space represented by the left matrix $U_1 \in IR^{I_1 \times J_1}$, a diagonal singular value matrix $\Sigma \in IR^{J_1 \times J_2}$, and an orthogonal row space represented by the right matrix $U_2 \in IR^{I_2 \times J_2}$. In terms of the mode-n products defined above, this matrix product can be rewritten as $D = \Sigma \times_1 U_1 \times_2 U_2$. If the data contained within the tensor D is represented as a matrix D, the SVD procedure for a matrix can be used.

By extension, the tensor D can be an order-N tensor comprising N spaces, where N is preferrably greater than 2. N-mode SVD is a natural generalization of SVD that orthogonalizes these N spaces, and decomposes the tensor as the mode-n product of N-orthonormal spaces.

$$D = Z \times_1 U_1 \times_2 U_2 \ldots \times_n U_n \ldots \times_N U_N,$$

A matrix representation of the N-mode SVD can be obtained by:

$$D_{(n)} = U_n Z_{(n)} (U_{n+1} U_{n+2} \ldots U_N U_1 \ldots U_{n-1})^T$$

where $\otimes$ is the matrix Kronecker product. The core tensor Z, can be analogous to the diagonal singular value matrix in conventional matrix SVD. It is important to realize, however, that the core tensor does not have a diagonal structure; rather, Z is in general a full tensor. The core tensor Z governs the interaction between mode matrices $U_n$, for $n=1, \ldots, N$. Mode matrix $U_n$ contains the orthonormal vectors spanning the column space of the matrix $D_{(n)}$ that results from the mode-n flattening of the tensor D, as illustrated in FIGS. 12A-12F.

As shown in FIG. 3, the procedure of step 204 begins at step 302 by setting an index n to one (1). This allows the process 204 to begin computing an initial matrix from the tensor D. When the index n is set to one, the procedure of step 204 advances to step 304. In step 304, the procedure of step 204 computes the matrix $U_n$ as defined by $D = Z \times_1 U_1 \times_2 U_2 \ldots \times_n U_n \ldots \times_N U_N$, by computing the SVD of the flattened matrix $D_{(n)}$. Once the matrix $U_n$ is computed, the procedure of step 204 continues to step 306. In step 306 the procedure of step 204 sets the matrix $U_n$ to be a left matrix of the SVD. Once the matrix $U_n$ is set appropriately, the procedure of step 204 goes on to step 308, in which it is determined whether the index n is equal to the order of the tensor, i.e. N. If the index n is equal to the order of the tensor, the procedure of step 204 advances to step 312. Otherwise, the process 204 is forwarded to step 310. In step 310, the index n is incremented by one, and then the procedure of step 204 is directed to step 304. In step 312, the core tensor Z is solved for as follows:

$$Z = D \times_1 U_1^T \times_2 U_2^T \ldots \times_n U_n^T \ldots \times_N U_N^T.$$

When the core tensor Z is selected, the procedure of step 204 is completed.

It should be noted that when $D_{(n)}$ is a non-square matrix, the computation of $U_n$ in the singular value decomposition $D_{(n)} = U_n \Sigma V_n^T$ can be performed, depending on which dimension of $D_{(n)}$ is smaller, by decomposing either $D_{(n)} D_{(n)}^T = U_n \Sigma^2 U_n^T$ and then computing $V_n^T = \Sigma^+ U_n^T D_{(n)}$, or by decomposing $D_{(n)}^T D_{(n)} = V_n \Sigma^2 V_n^T$ and then computing $U_n = D_{(n)} V_n \Sigma^+$.

Figure 4:
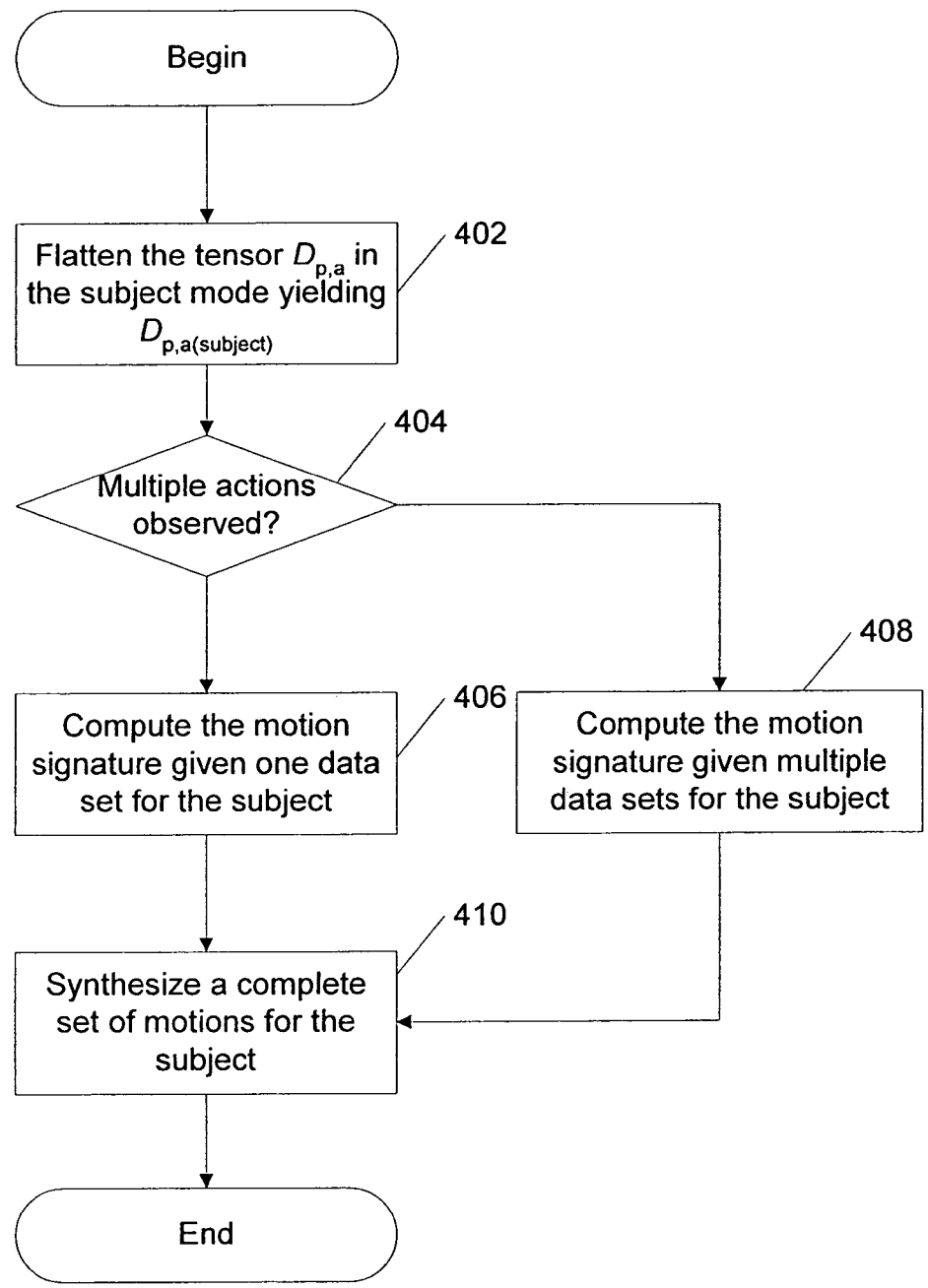
FIG. 4 is a flow diagram of an exemplary embodiment of a process of FIG. 2 which synthesizes the remaining actions for a new individual.

FIG. 4 illustrates the details of the individual generation procedure of step 208, which synthesizes the remaining actions, which were never before seen, for a new subject. The remaining actions are generated given the new motion data tensor $D_{p,a}$ of the new subject performing action a, which includes at least one action. The individual generation procedure of step 208 solves for the signature p of the new individual in the equation $D_{p,a} = B_a \times_1 p^T$, where $B_a = Z \times_2 a_a^T \times_3 J$. It should be noted that new data tensor $D_{p,a}$ is a 1×1×T tensor. In particular, step 402 of this procedure flattens the new data tensor $D_{p,a}$ in the people (or subject) mode, yielding a row vector $d_a^T$. By flattening this new data tensor in the subject mode, the matrix $D_{p,a(subject)}$ is generated, and in particular a row vector which we can denote as $d_a^T$ is produced. Therefore, in terms of the flattened tensors, the equation $D_{p,a} = B_a \times_1 p^T$ described above can be written as $d_a^T = p^T B_{a(subject)}$ or $d_a = B_{a(people)}^T p$. Once the tensor is flattened, the process advances to step 404, in which it is determined if the subject is observed performing a single action. If the subject is observed performing a single action, the procedure of step 208 is forwarded to step 406. If the individual is observed performing at least two actions, the procedure of step 208 advances to step 408. In step 406, the motion signature for the individual given a single observed action is computed. The motion signature for the individual can be defined as $p^T = d_a^T B_{a(people)}^{-1}$. When the motion signature for the individual is computed, the procedure of step 208 is completed. Also in step 408, the motion signature for the individual given at least two observed actions is determined. If several different actions $d_{a,k}$ are observed, the motion signature can be computed as follows:

$$p_t = [\ldots d_{ak}^T \ldots] \begin{bmatrix} \vdots \\ B_{ak(people)}^{-1} \\ \vdots \end{bmatrix}.$$

In step 410, the procedure of step 208 synthesizes a complete set of motions for the subject or individual. The complete set of motions for the new subject can be synthesized as follows:

$$D_p = B \times_1 p^T,$$

where B is defined as $B = Z \times_2 A \times_3 J$, as described above. When the motion signature for the individual is computed, the process 208 exits.

Figure 5:
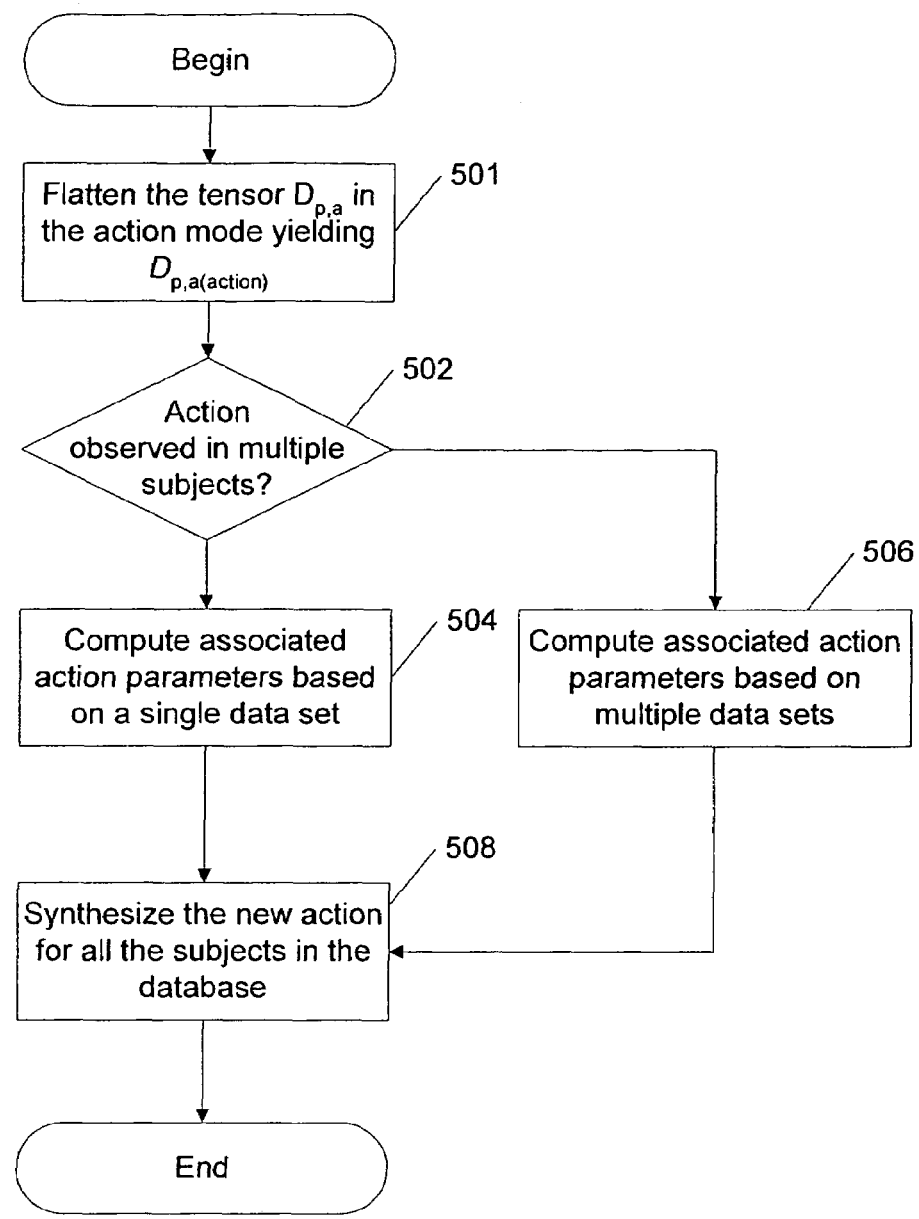
FIG. 5 is a flow diagram of an exemplary embodiment of an action generation procedure of the process of FIG. 2 which synthesizes an observed action for a set of individuals.

FIG. 5 illustrates details of the action generation procedure of step 212, which synthesizes an observed new action that has never before been seen for the remainder of the subjects represented in the subject matrix P. The observed action for the remainder of the subjects represented in the subject matrix P is generated given the new motion data tensor $D_{p,a}$ of at least one subject performing the new action a.

In particular, step 501 of this procedure flattens the new data tensor $D_{p,a}$ in the action mode, yielding a row vector $d_p^T$. By flattening this new data tensor in the action mode, the matrix $D_{p,a(action)}$ is generated, and in particular a row vector which we can denote as $d_p^T$ is produced. Therefore, in terms of the flattened tensors, the equation $D_{p,a} = C_p \times_2 a^T$ described above can be written as $d_p^{T=a^T} C_{p(actions)}$ or $d_p = C_{p(actions)}^T a$. Once the tensor is flattened, this procedure determines as to whether the new motion data tensor $D_{p,a}$ represents one subject performing the new action in step 502. If the new motion data tensor $D_{p,a}$ represents one subject performing the new action, the procedure of step 212 advances to step 504. If the new motion data tensor $D_{p,a}$ represents more than one individual performing the new action, the procedure of step 212 is forwarded to step 506. In step 504, the associated action parameters are determined based on the new motion data tensor $D_{p,a}$, which represents one subject performing the new action. If a known subject, e.g., a person who is already recorded in the motion database, performs a new type of action $d_p$, it is possible to compute the associated action parameters $a^T = d_p^T C_{p(actions)}^{-1}$. When the associated action parameters are computed, the procedure of step 212 is directed to step 508.

In step 506, the associated action parameters are computed based on the new motion data tensor $D_{p,a}$, which represents more than one subject performing the new action. If several different subjects are observed performing the same new action $d_{pk}$, the action parameters are computed as follows:

$$a^T = [\ldots d_{pk}^T \ldots] \begin{bmatrix} \vdots \\ C_{Pk(actions)}^{-1} \\ \vdots \end{bmatrix}.$$

When the associated action parameters are computed, the process 212 advances to step 508, in which the new action are obtained for the remainder of the subjects represented in the subject matrix P. The new action for all the subjects in the database can be synthesized as follows: $D_a = C \times_2 a^T$, where C is given as $C = Z \times_1 P \times_3 J$, supra. When the new action is synthesized, the procedure of step 212 is completed.

Figure 6:
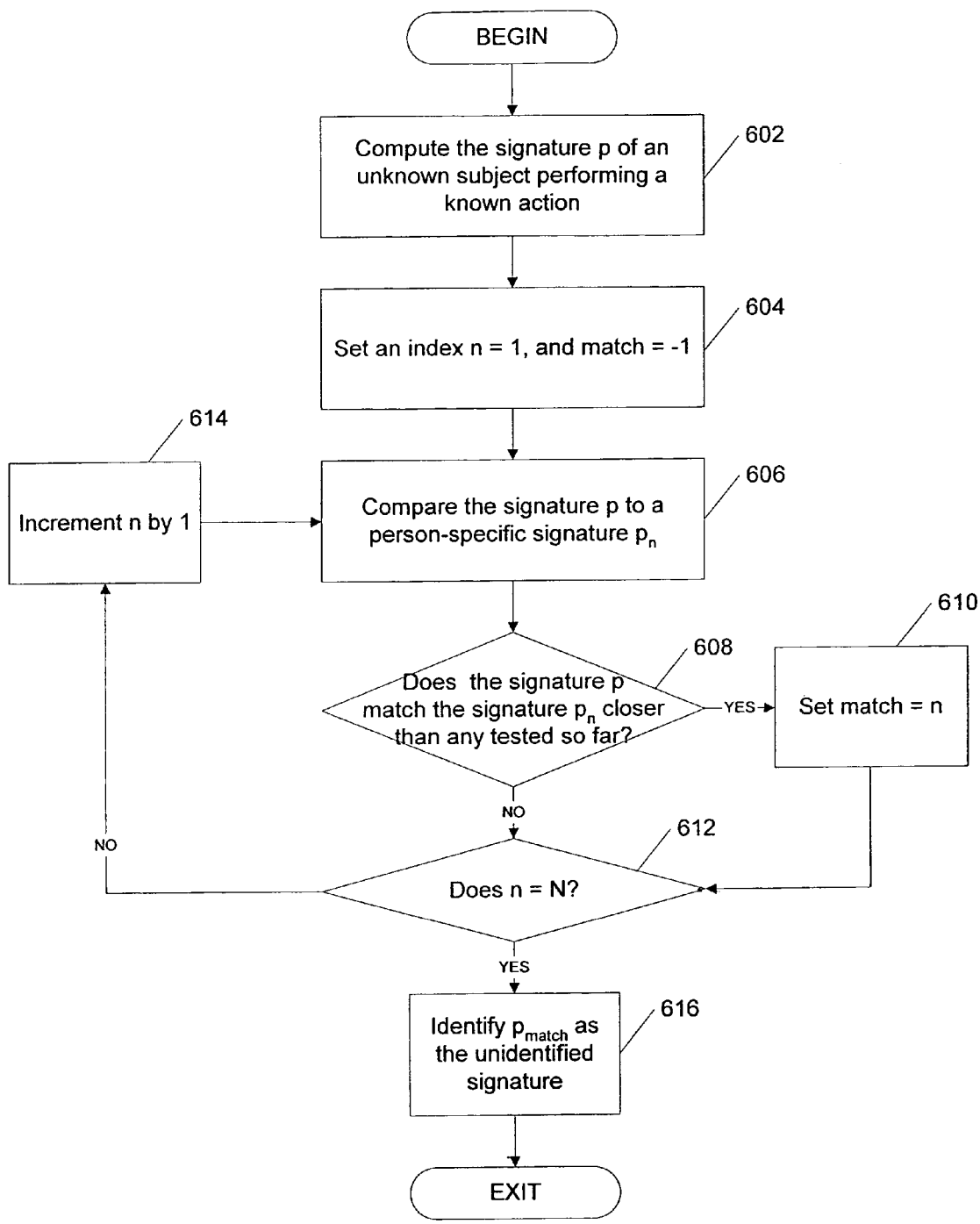
FIG. 6 is a flow diagram of an exemplary embodiment of an individual recognition procedure of the process of FIG. 2 which recognizes an unidentified individual performing a known actions as one of a group of individuals.

FIG. 6 illustrates an individual recognition procedure of step 216 for recognizing an unidentified subject performing a known action. Multilinear analysis, can provide basis tensors that map certain observed motions into the space of subject parameters (thereby enabling the recognition of people from motion data) or the space action parameters (thereby enabling the recognition of action from motion data). The individual recognition process 216 begins at step 602, in which the signature p of an unknown subject performing a known action is computed. The new motion vector d of a known action a can be mapped into the subject signature space, by computing the signature $p = B_{a(people)}^{-T} d$. Once the signature is computed, the process 216 advances to step 604, in which an index variable n and a variable match are initialized. For example, the index variable n can be initialized to one (1) and the variable match may be initialized to negative one (−1). Once these variables are initialized, step 606 is performed in which, the signature p is compared to a subject signature $p_n$. This signature is compared against each of the person signatures $p_n$ in P. Then the magnitude of the difference between the signature p and the signature $p_n$, i.e. $\|p - p_n\|$ is determined.

Thereafter, in step 608, it is determined whether a process-computed magnitude of the difference between the signature p and the signature $p_n$ is smaller than any magnitude computed up to this point. If the magnitude of the difference between the signature p and the signature $p_n$ is smaller than any difference computed up to this point, the process 216 advances to step 610. Otherwise, the process 216 is forwarded to step 612. In step 610, the variable match is set to be equal to the index n. The variable match generally signifies the index of the recognized subject, such that the signature p most closely matches the signature $p_{match}$.

Then, in step 612, it is determined if the index n is equal to G. If that is the case, the procedure of step 216 advances to step 616, otherwise the procedure of step 216 is forwarded to step 614. In step 614, the index n is incremented by one (1), and the procedure is returned to step 606, such that each of the subjects in the subject matrix P from 1 to G is subjected to the comparison. Finally, in step 616, the signature $p_{match}$ is identified as the signature that most closely approximates the signature p. In a preferred embodiment of the present invention, the variable match is an indexed array, which records the indices of multiple signatures that most closely match the signature p. Once the signature $p_{match}$ is identified, the procedure of step 216 is completed.

FIG. 7 illustrates the details of an action recognition procedure of step 220 for recognizing an unknown action being performed by a known subject.

Generally, a multilinear analysis yields basis tensors that map the observed motions into the space of action parameters, thus enabling the recognition of actions from the motion data. In particular, step 702 computes the vector a of a known individual performing an unknown action. The new motion data vector d of a known person p can be mapped into the action parameter space by computing the vector $a = C_{p(actions)}^{-T} d$. When the vector a is determined, the procedure of step 220 advances to step 704, in which an index variable m and a variable match are initialized. The index variable m can be initialized to one (1), and the variable match may be initialized to negative one (−1). Once these variables are initialized, the process 220 is forwarded to step 706, in which the vector a is compared to an action parameter vector $a_m$. In particular, the vector a is compared against each of the action parameter vectors $a_m$ in A, in turn, as the index m is incremented. The magnitude of the difference between the vector a and the action parameter vector $a_m$, i.e. $\|a-a_m\|$, is also determined.

In step 708, the procedure of step 220 determines whether process computed magnitude of the difference between the vector a and the action parameter vector $a_m$ is smaller than any difference computed up to this point. If the magnitude of the difference between the vector a and the action parameter vector $a_m$ is smaller than any difference computed up to this point, the procedure of step 220 advances to step 710. Otherwise, the procedure of step 220 is forwarded to step 712. In step 710, the procedure of step 220 sets the variable match is set to be equal to the index m. The variable match generally signifies the index of the recognized action, such that the vector a most closely matches the action parameter vector $a_{match}$.

Then, in step 712, it is determined if the index m is equal to M. If that is the case, the procedure of step 220 advances to step 716, otherwise the procedure is forwarded to step 714. Step 714, indicates that the index m is incremented by one (1), and the procedure advances to step 706, such that the index m increments through each of the actions in the action matrix A from 1 to M. In step 714, the action parameter vector $a_{match}$ is identified as the signature that most closely approximates the vector a. In a preferred embodiment of the present invention, the variable match can be an indexed array, which records the indices of multiple actions that most closely match the vector a. Once the action parameter vector $a_{match}$ is identified, the procedure of step 220 is completed.

B. Facial Signatures Using a Tensor Representation of a Corpus of Data

Figure 8:
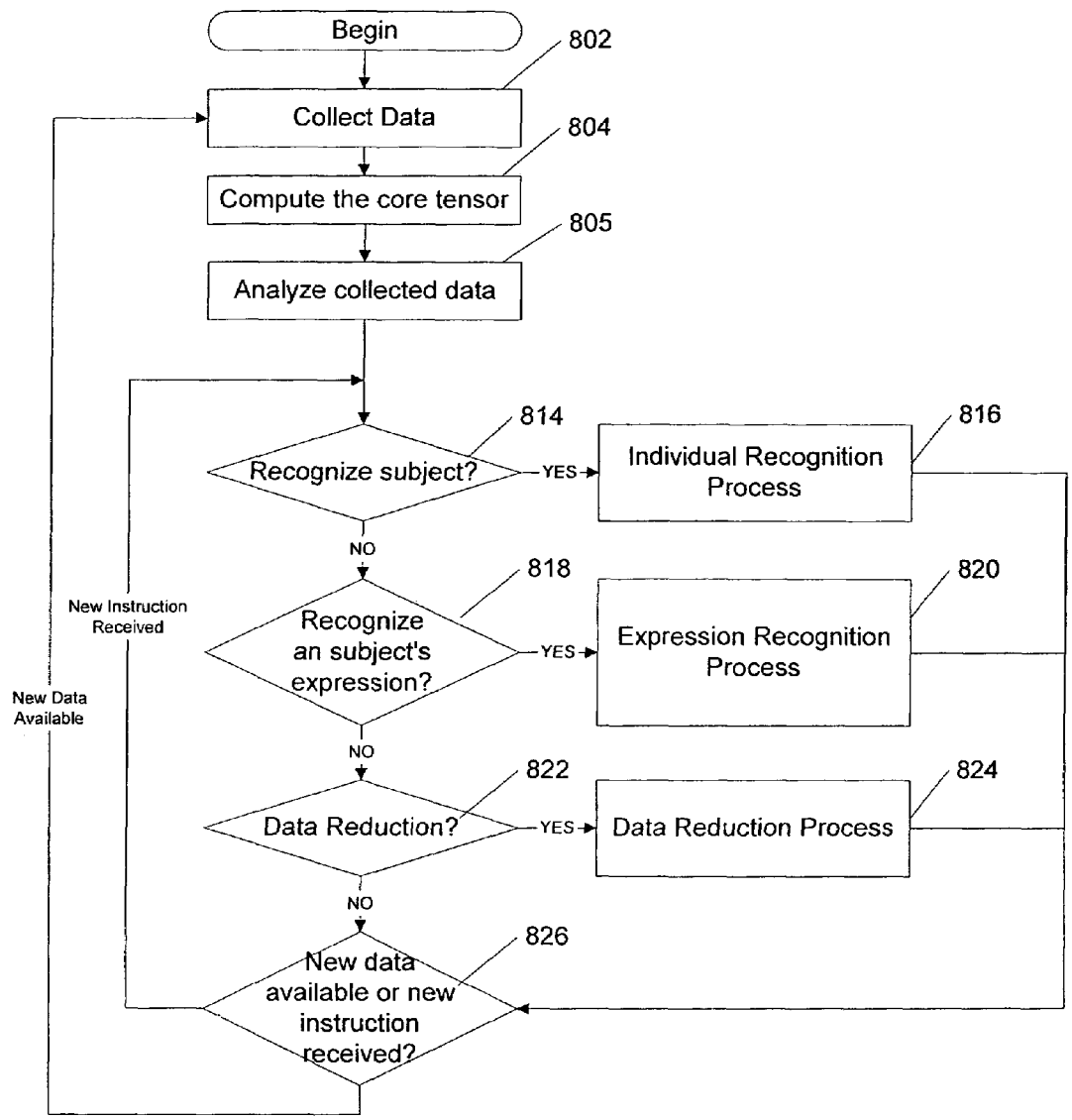
FIG. 8 is a flow diagram of another exemplary embodiment of a process according to the present invention which analyzes multilinear data.

FIG. 8 illustrates a flow diagram of an exemplary embodiment of a process implementing a multilinear data analysis application 800 according to the present invention. As described above, the multilinear data analysis application 800 may be configured to recognize the unknown subject, unknown expression, unknown viewpoint and unknown, and synthesize a known illumination never before recorded for the subject, dimensionally reduce the amount of data describing illuminations, etc. The multilinear data analysis application 800 utilizes a corpus of facial data, which is collected using the data capturing system 112 from different subjects. The corpus of facial information can be stored in the database 108 of the server 102. This corpus of facial information may describe the illuminations, the views, the expressions, and the subjects captured in images made of pixels. The corpus of facial information is organized as a tensor D. The tensor D takes the form of a $\mathrm{IR}^{G \times V \times I \times E \times P}$ tensor, where G is the number of subjects, V is the number of viewpoints, I is the number of illuminations, E is the number of expressions, and P is the number of pixels. It should be understood that the corpus of motion information can also be organized as a matrix D or a vector d. For example, if the information is organized as a matrix D, the process 800 preferably remains the same, but the underlying tensor procedures could be converted to matrix procedure equivalents. It should also be noted that representing the data contained in the tensor D may integrate multiple indices into a singular matrix index. Likewise, if the information is organized as a vector d, the process 800 preferably remains the same, but the underlying tensor procedures could be converted to vector procedure equivalents. It should also be noted that representing the data contained in the tensor D may integrate multiple indices into a singular vector index.

In a preferred embodiment of the present invention, three expressions can be collected for each person: e.g., smile, neutral, and yawn. Each expression may be captured in four different illuminations, i.e. light positions, and three different viewpoints. The four different illuminations may be one light from the center, one light from the right, one light from the left, and two lights one from the right and one from the left. The three different viewpoints may be center, 34 degrees to the right, and 34 degrees to the left. In another preferred embodiment of the present invention, further similar expressions are collected for each person such that each expression is captured in four different illuminations and two different viewpoints. For example, the four different illuminations are one light from the center, one light from the right, one light from the left, and two lights one from the right and one from the left. The two different viewpoints are 17 degrees to the right, and 17 degrees to the left. In still another exemplary embodiment of the present invention, each expression is captured in three different illuminations and five different viewpoints. For example, the three different illuminations are one light from the center, one light from the right, and one light from the left. Also, the five different viewpoints are center, 17 degrees to the right, 17 degrees to the left, 34 degrees to the right, and 34 degrees to the left.

As shown in FIG. 8 step 802 provides that the multilinear data analysis application 800 collects facial information describing the illumination, viewpoint, expression, and subject. New facial data is collected describing the illumination of individual pixels of views of expressions of subjects. If each of the illuminations, each of the views, each of the expressions and individual are known, the data is integrated to the tensor D. Otherwise, the data cannot be integrated into the tensor D until those pieces of information are determined. The data describing an unknown illumination, view, expression or individual is organized as a new data vector d. The new data vector d describes an image having certain illumination, view, and expression data. Then in step 804, the multilinear data analysis application 800 solves for the core tensor Z. For example, this step can be an N-mode SVD procedure 304 as shown in FIG. 3 and described below in relation to FIG. 3. The N-mode SVD procedure 304 solves for the core tensor Z with N being equal to 5. When the procedure 804 or 304 computes the core tensor Z, the multilinear data analysis application 800 advances to step 806. Given the tensor D takes the form of a $\mathrm{IR}^{G \times V \times I \times E \times P}$ tensor, where G is the number of subjects, V is the number of viewpoints, I is the number of illuminations, E is the number of expressions, and P is the number of pixels. The N-mode SVD process 804 decomposed the tensor D as follows:

$$D = Z \times_1 U_{subjects} \times_2 U_{views} \times_3 U_{illum} \times_4 U_{express} \times_5 U_{pixels}$$

where the G×V×I×E×P core tensor Z governs the interaction between the factors represented in the 5 mode matrices: The G×G mode matrix $U_{subjects}$ spans the space of subject parameters, the V×V mode matrix $U_{views}$ spans the space of viewpoint parameters, the I×I mode matrix $U_{illum}$ spans the space of illumination parameters and the E×E mode matrix $U_{express}$ spans the space of expression parameters. The P×P mode matrix $U_{pixels}$ orthonormally spans the space of images.

The multilinear data analysis incorporates aspects of a linear principal component analysis ("PCA") analysis. Each column of $U_{subjects}$ is an "eigenimage". These eigenimages are preferably identical to the conventional eigenfaces, since the eigenimages are computed by performing the SVD on the mode-5 flattened data tensor D so as to yield the matrix $D_{subjects}$. One of the advantages of multilinear analysis is that the core tensor Z can transform the eigenimages in $U_{pixels}$ into a set of eigenmodes, which represent the principal axes of variation across the various modes (subject, viewpoints, illuminations, expressions), and represent how the various factors interact with each other to create the facial images. This can be accomplished by generating the product $Z \times_5 U_{pixels}$. In contrast, the PCA basis vectors or eigenimages represent only the principal axes of variation across images.

The facial image database can include V·I·E images for each subject which vary with viewpoint, illumination and expression. The PCA output represents each subject as a set of V·I·E vector-valued coefficients, one from each image in which the subject appears.

Multilinear analysis allows each subject to be represented, regardless of viewpoint, illumination, and expression, with the same coefficient vector of dimension G relative to the bases comprising the G×V×I×E×P tensor $$D = Z \times_2 U_{views} \times_3 U_{illum} \times_4 U_{express} \times_5 U_{pixels}.$$

Each column in the tensor D is a basis matrix that comprises N eigenvectors. In any column, the first eigenvector depicts the average subject, and the remaining eigenvectors capture the variability across subjects for the particular combination of viewpoint, illumination and expression associated with that column. Each image is represented with a set of coefficient vectors representing the subject, view point, illumination and expression factors that generated the image. Multilinear decomposition allows the multilinear data analysis application 800 to construct different types of basis depending on the instruction received from the client interface application.

In particular step 814 of FIG. 8 provides that the multilinear data analysis application 800 determines whether the client interface application has instructed the multilinear data analysis application 800 to recognize an unknown subject who has been observed displaying a known expression as one of the population of observed known subjects. If the multilinear data analysis application 800 has received such instruction, the multilinear data analysis application 800 advances to an individual recognition procedure of step 816, shown in greater detail in FIG. 9 and described infra. When the individual recognition procedure of step 816 is completed as the multilinear data analysis application 800 advances to step 826. In step 818, the multilinear data analysis application 800 determines whether the client interface application has instructed the multilinear data analysis application 800 to recognize an unknown expression being displayed by a known subject as one of the expressions already observed as being performed by such known subject. If the multilinear data analysis application 800 has received such instruction, the multilinear data analysis application 800 advances to an expression recognition procedure of step 820, as shown in greater detail in FIG. 10 and described infra. When the expression recognition procedure of step 820 is completed, the multilinear data analysis application 800 is forwarded to step 826.

Thereafter, in step 822, the multilinear data analysis application 800 determines whether the client interface application has instructed the multilinear data analysis application 800 to dimensionally reduce the amount of data describing illuminations. If the multilinear data analysis application 800 has received such instruction, the multilinear data analysis application 800 advances to a data reduction procedure of step 824, as shown in greater detail in FIG. 11 and described infra. Once the data reduction procedure of step 824 is complete, the multilinear data analysis application 800 advances to step 826. Finally, in step 826, the multilinear data analysis application 800 determines whether a data set for a new subject should be collected or if the client interface application transmitted new instruction. If a data set for a new subject displaying an expression (e.g., a facial expression) is available, the multilinear data analysis application 800 advances to step 802. If the multilinear data analysis application 800 has received a new instruction from the client interface application, the multilinear data analysis application 800 advances to step 814.

Figure 9:
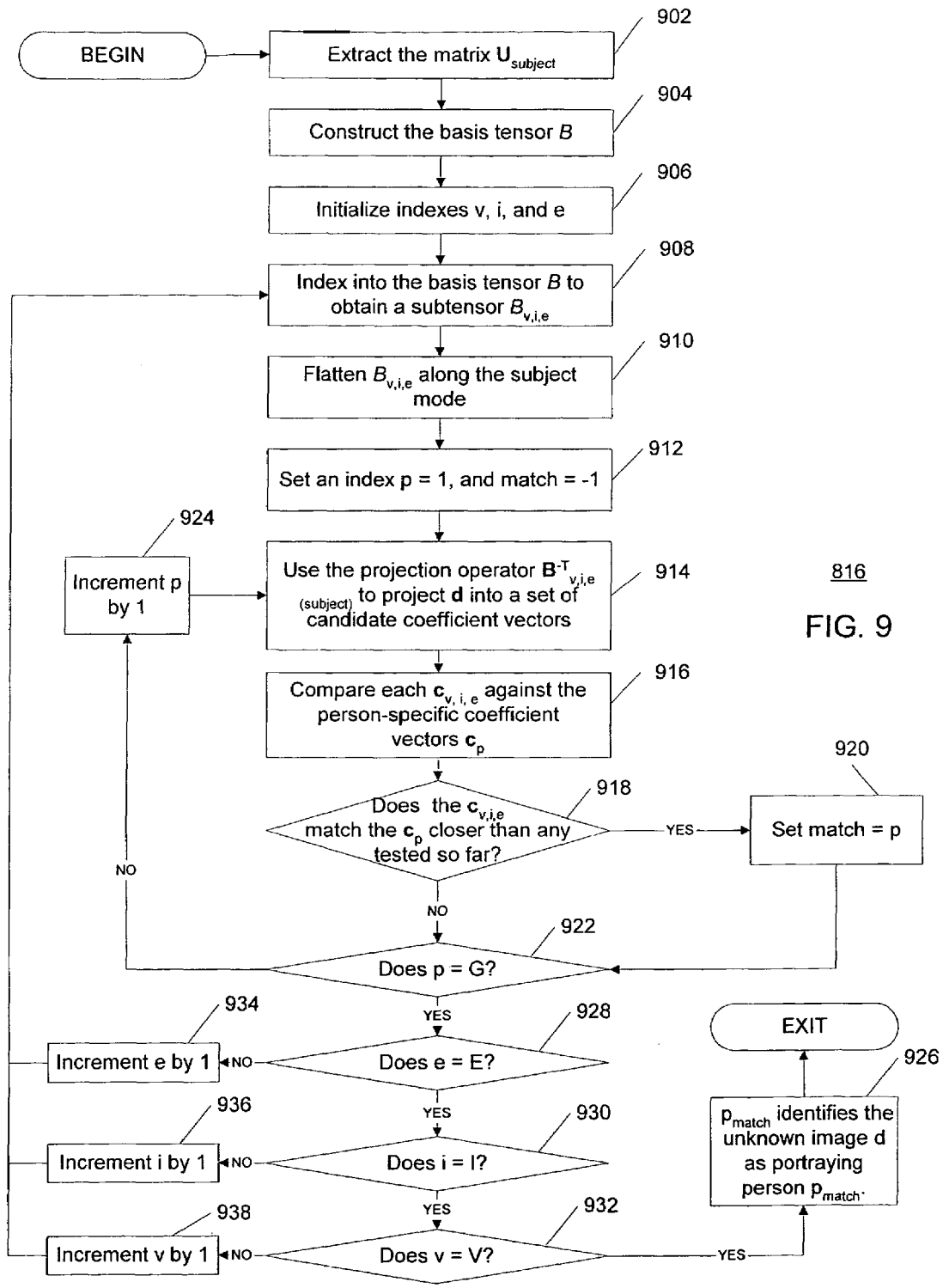
FIG. 9 is a flow diagram of an exemplary embodiment of the individual recognition procedure of the process of FIG. 8 which recognizes an unidentified individual given an unknown facial image.

FIG. 9 illustrates a flow diagram of the details of the individual recognition procedure of step 816 for recognizing an unidentified subject given an unknown facial image: the new data vector d. The multilinear data analysis preferably yields a basis tensor (as defined below) that maps all images of a subject to the same point in the subject parameter space, thus creating a many-to-one mapping. The individual recognition procedure of step 816 begins at step 902, in which the matrix $U_{subjects}$ is extracted. The N-mode SVD procedure of step 804 (or step 304) decomposes the tensor D resulting in the expression $D = Z \times_1 U_{subjects} \times_2 U_{views} \times_3 U_{illium} \times_4 U_{express} \times_5 U_{pixels}$, and the matrix $U_{subjects}$ is extracted from this expression. In particular, the matrix $U_{subjects}$ contains row vectors $c_p^T$ of coefficients for each person p. Once the matrix $U_{subjects}$ is extracted, the procedure of step 816 advances to step 904, in which the basis tensor B is generated. The basis tensor B is constructed according to $B = Z \times_2 U_{views} \times_3 U_{illum} \times_4 U_{express} \times_5 U_{pixels}$. Upon the completion of the construction of the basis tensor B the procedure of step 816 advances to step 906 where this procedure initializes indexes v, i and e to one (1). At step 908, the individual recognition procedure of step 816 indexes into the basis tensor B to obtain a sub-tensor $B_{v,i,e}$. This is performed for a particular viewpoint v, illumination i, and expression e to obtain the subtensor $B_{v,i,e}$ having dimensions G×1×1×1×P.

Then, in step 910, the subtensor $B_{v,i,e}$ is flattened along the subject mode. The subtensor $B_{v,i,e}$ is flattened along the subject mode to obtain the G×P matrix $B_{v,i,e(subject)}$. It should be noted that a specific training image $d_d$ of subject p in viewpoint v, illumination i, and expression e can be written as $d_{p,v,i,e} = B_{v,i,e(subject)}^T c_p$; hence, $c_{p=Bv,i,e(subject)}^{-T} d_{p,v,i,e}$.

Then, in step 912, an index variable p and a variable match are initialized. For example, the index variable p is initialized to one (1), and the variable match is initialized to negative one (−1). Once these variables are initialized, the procedure of step 816 advances to step 914, in which. the projection operator $B_{v,i,e(subject)}^{-T}$ is used to project the new data vector d into a set of candidate coefficient vectors. Given the new data vector d, the projection operator $B_{v,i,e(subject)}^{-T}$ is used to project the new data vector d into a set of candidate coefficient vectors $c_{v,i,e} = B_{v,i,e(subject)}^{-T} d$ for every v, i, e combination. In step 916, each of the set of candidate coefficient vectors $c_{v,i,e}$ is compared against the person-specific coefficient vectors $c_p$. The comparison can be made according to the following equation:

$$\|c_{v,i,e} - c_p\|.$$

In step 918, it is determined whether the set of candidate coefficient vectors $c_{v,i,e}$ is the closest match to the subject-specific coefficient vectors $c_p$ up to this point. The best matching vector $c_p$ can be the one that yields the smallest value of $\|c_{v,i,e} - c_p\|$ among all viewpoints, illuminations, and expressions. If the magnitude of the difference between the set of candidate coefficient vectors $c_{v,i,e}$ and the subject-specific coefficient vectors $c_p$ is smaller than any difference computed up to this point, the procedure of step 816 advances to step 920. Otherwise, the magnitude of the difference between the set of candidate coefficient vectors $c_{v,i,e}$ and the procedure of step 816 is forwarded to step 922. Step 920 provides that the variable match is set to be equal to the index p. The variable match signifies the index of the most closely matched subject, such that the set of candidate coefficient vectors $c_{v,i,e}$ most closely matches the subject-specific coefficient vectors $c_{match}$.

Thereafter, in step 922, it is determined if the index p is equal to G. If that is the case, the procedure of step 816 sets the index p is set equal to one (1) and advances to step 928; otherwise, the procedure of step 816 advances to step 924. In step 924, the index p is incremented by one (1), and the procedure of step 816 advances to step 914, such that the procedure tests each of the subjects in the subject matrix $U_{subject}$ from 1 to G.

In step 928, it is determined if the index e is equal to E. If that is the case, the procedure of step 816 sets the index e equal to one (1) and advances to step 930; otherwise, the procedure of step 816 advances to step 934. In step 934, the index e is incremented by one (1), and the procedure of step 816 advances to step 908, such that the procedure tests each of the subjects in the subject matrix $U_{express}$ from 1 to E.

In step 930, it is determined if the index i is equal to I. If that is the case, the procedure of step 816 sets the index i equal to one (1) and advances to step 932; otherwise, the procedure of step 816 advances to step 936. In step 936, the index i is incremented by one (1), and the procedure of step 816 advances to step 908, such that the procedure tests each of the subjects in the subject matrix $U_{illum}$ from 1 to I.

In step 932, it is determined if the index v is equal to V. If that is the case, the procedure of step 816 advances to step 926; otherwise, the procedure of step 816 advances to step 938. In step 938, the index v is incremented by one (1), and the procedure of step 816 advances to step 908, such that the procedure tests each of the subjects in the subject matrix $U_{views}$ from 1 to V. Finally, in step 926, the subject match can be identified as the subject portrayed in the new data vector d. In a preferred embodiment of the present invention, the variable match can be an indexed array, that records the indices of multiple subjects most closely matching the subjects portrayed in the new data vector d. Once the subject match is identified, the procedure of step 816 is completed.

Figure 10:
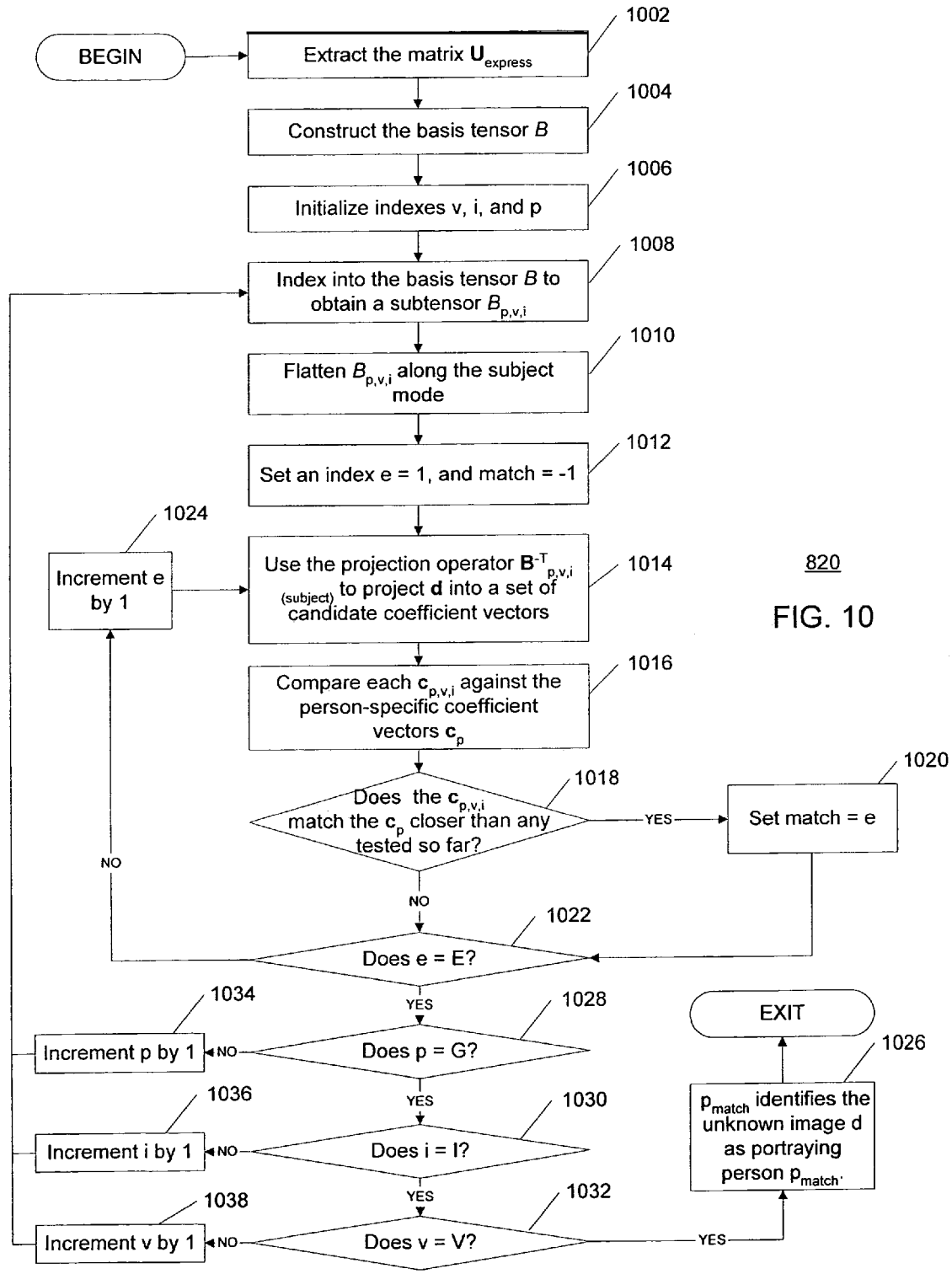
FIG. 10 is a flow diagram of an exemplary embodiment of the expression recognition procedure of the process of FIG. 8 which recognizes of an unidentified expression being displayed by a known person.

FIG. 10 illustrates a flow diagram of the details of the expression recognition procedure of step 820 for recognizing an unidentified expression given an unknown facial image: the new data vector d. The expression recognition procedure of step 820 is largely the same as the subject recognition procedure of step 816. The expression recognition procedure of step 820 begins in step 1002, in which the matrix $U_{express}$ is extracted, in a manner similar to that used to extract $U_{subjects}$ in step 902. In particular, the matrix $U_{express}$ contains row vectors $c_e^T$ of coefficients for each expression e. Once the matrix $U_{express}$ is extracted, the procedure of step 820 advances to step 1004, in which the basis tensor B is generated. The basis tensor B is constructed according to $B = Z \times_2 U_{views} \times_3 U_{illum} \times_1 U_{subjects} \times_5 U_{pixels}$. Upon the completion of the construction of the basis tensor B the procedure of step 820 advances to step 1006 where this procedure initializes indexes v, i and p to one (1). At step 1008, the expression recognition procedure of step 820 indexes into the basis tensor B to obtain a sub-tensor $B_{p,v,i}$.

This is performed for a particular subject p, viewpoint v and illumination i to obtain the subtensor $B_{p,v,i}$ having dimensions 1×1×1×E×P.

Then, in step 1010, the subtensor $B_{p,v,i}$ is flattened along the expression mode. The subtensor $B_{p,v,i}$ is flattened along the expression mode to obtain the E×P matrix $B_{p,v,i(express)}$. It should be noted that a specific training image $d_d$ of subject p in viewpoint v, illumination i, and expression e can be written as $d_{p,v,i,e} = B_{p,v,i(subject)}^T c_e$; hence, $c_e = B_{p,v,i(subject)}^{-T} d_{p,v,i,e}$.

Then, in step 1012, an index variable e and a variable match are initialized. For example, the index variable e is initialized to one (1), and the variable match is initialized to negative one (−1). Once these variables are initialized, the procedure of step 820 advances to step 1014, in which. the projection operator $B_{p,v,i(subject)}^{-T}$ is used to project the new data vector d into a set of candidate coefficient vectors. Given the new data vector d, the projection operator $B_{p,v,i(subject)}^{-T}$ is used to project the new data vector d into a set of candidate coefficient vectors $c_{p,v,i} = B_{p,v,i(subject)}^{-T} d$ for every p, v, i combination. In step 1016, each of the set of candidate coefficient vectors $c_{p,v,i}$ is compared against the person-specific coefficient vectors $c_e$. The comparison can be made according to the following equation:

$$\|c_{p,v,i} - c_e\|.$$

In step 1018, it is determined whether the set of candidate coefficient vectors $c_{p,v,i}$ is the closest match to the expression coefficient vectors $c_e$ up to this point. The best matching vector $c_e$ can be the one that yields the smallest value of $\|c_{p,v,i} - c_e\|$ cell among all viewpoints, illuminations, and expressions. If the magnitude of the difference between the set of candidate coefficient vectors $c_{p,v,i}$ and the expression coefficient vectors $c_e$ is smaller than any difference computed up to this point, the procedure of step 820 advances to step 1020. Otherwise, the magnitude of the difference between the set of candidate coefficient vectors $c_{p,v,i}$ and the procedure of step 820 is forwarded to step 1022. Step 1020 provides that the variable match is set to be equal to the index p. The variable match signifies the index of the most closely matched expression, such that the set of candidate coefficient vectors $c_{p,v,i}$ most closely matches the expression coefficient vectors $c_{match}$.

Thereafter, in step 1022, it is determined if the index e is equal to E. If that is the case, the procedure of step 820 sets the index p is set equal to one (1) and advances to step 1028; otherwise, the procedure of step 820 advances to step 1024. In step 1024, the index p is incremented by one (1), and the procedure of step 820 advances to step 1014, such that the procedure tests each of the expressions in the expression matrix $U_{express}$ from 1 to E.

In step 1028, it is determined if the index p is equal to G. If that is the case, the procedure of step 820 sets the index e equal to one (1) and advances to step 1030; otherwise, the procedure of step 820 advances to step 1034. In step 1034, the index p is incremented by one (1), and the procedure of step 820 advances to step 1008, such that the procedure tests each of the subjects in the subject matrix $U_{subject}$ from 1 to G.

In step 1030, it is determined if the index i is equal to I. If that is the case, the procedure of step 820 sets the index i equal to one (1) and advances to step 1032; otherwise, the procedure of step 820 advances to step 1036. In step 1036, the index i is incremented by one (1), and the procedure of step 820 advances to step 1008, such that the procedure tests each of the illuminations in the illumination matrix $U_{illum}$ from 1 to I.

In step 1032, it is determined if the index v is equal to V. If that is the case, the procedure of step 820 advances to step 1026; otherwise, the procedure of step 820 advances to step 1038. In step 1038, the index v is incremented by one (1), and the procedure of step 820 advances to step 1008, such that the procedure tests each of the views in the view matrix $U_{views}$ from 1 to V. Finally, in step 1026, the subject match can be identified as the subject portrayed in the new data vector d. In a preferred embodiment of the present invention, the variable match can be an indexed array, that records the indices of multiple subjects most closely matching the subjects portrayed in the new data vector d. Once the subject match is identified, the procedure of step 820 is completed.

Figure 11:
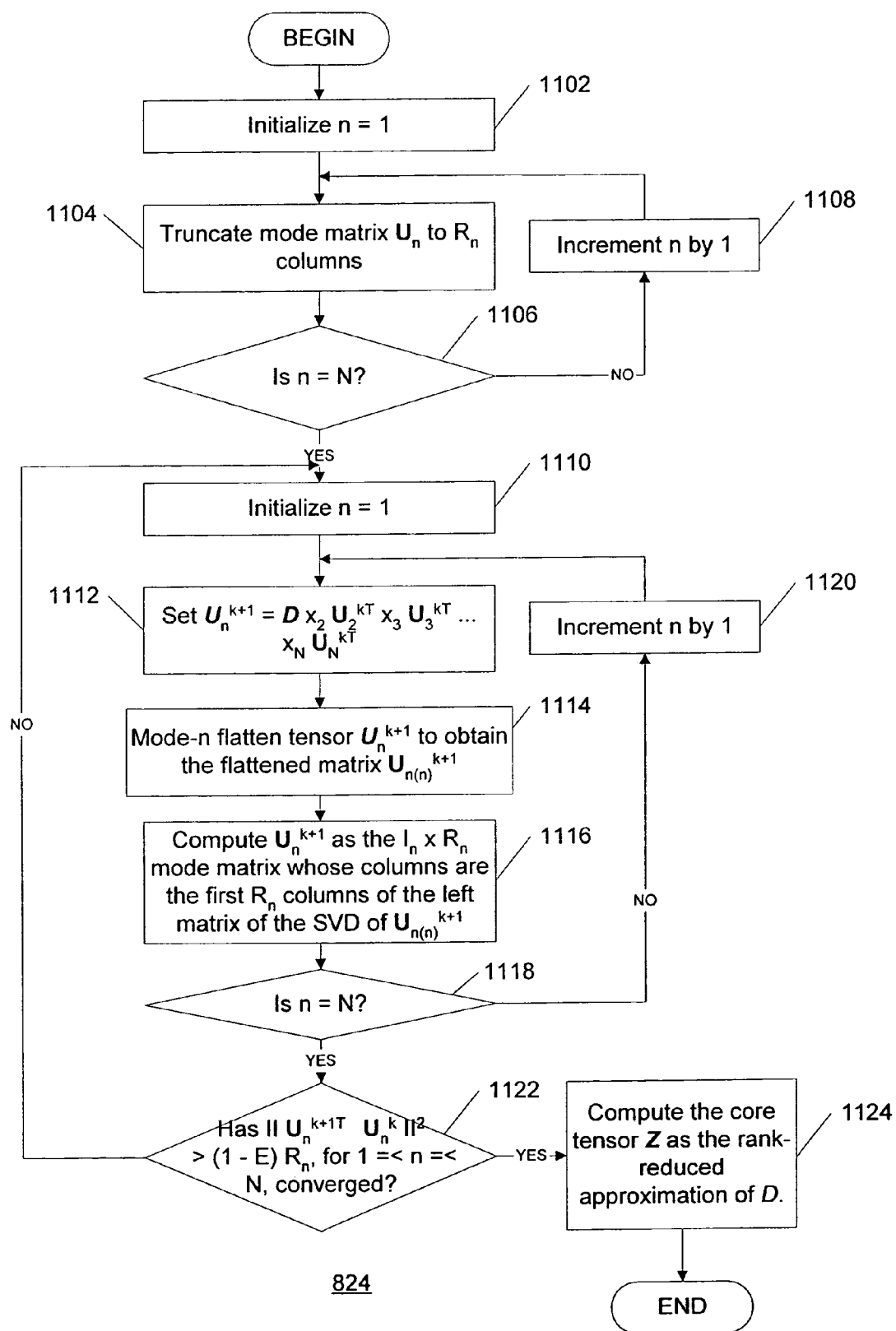
FIG. 11 is a flow diagram of an exemplary embodiment of a data reduction process of the process of FIG. 8 which dimensionally reduces the amount of data describing an individual displaying an expression.

FIG. 11 illustrates a flow diagram of the details for the data reduction procedure step 824 for dimensionally reduce the amount of data describing illuminations. This data reduction procedure step 824 reduces the amount of data by truncating the mode matrices resulting from the N-mode SVD procedure 304 or 804, where N=5. The truncation of the mode matrices yields an exemplary reduced-dimensionality approximation D'. The truncation of the mode matrices results in the approximation of the tensor D with reduced ranks $R_1 \leq I_1, R_2 \leq I_2, \ldots, R_N \leq I_N$ that has a bounded error $$\|D - D'\|^2 \leq \sum_{i_1 = R_1+1}^{I_1} \sigma_{i_1}^2 + \ldots + \sum_{i_N = R_N+1}^{I_N} \sigma_{i_N}^2,$$

where the smallest mode-n singular values that were discarded are defined as $\sigma_{i_n=R_n+1}, \sigma_{i_n=R_n+2}, \ldots, \sigma_{i_n=I_n}$. The $R_n^{th}$ mode-n eigenvalue is the Frobenius norm of the subtensor $Z_{i_1,\ldots,i_n=m,\ldots,i_N}$. The subtensor $Z_{i_1,\ldots,i_n=R_n,\ldots,i_N}$ is extracted from the tensor Z by holding the $n^{th}$ dimension fixed to $i_n=R_n$ and varying all other dimensions. Once the index n is initialized, the procedure step 824 advances to step 1104.

In another exemplary dimensionality reduction procedure for use on the tensors is to compute for a tensor D a best rank-$(R_1, R_2, \ldots, R_N)$ approximation $D'=Z'\times_1 U'_1 \times_2 U'_2 \ldots \times_N U'_N$, with orthonormal $I_n \times R_n$ mode matrices $U'_n$, for n=1, 2, ..., N, which can minimize the least-squares error function $\|D-D'\|^2$. For example, N can equal to five (5). The data reduction procedure step 824 begins in step 1102, where an index n is initialized to one (1).

In step 1104, the mode matrix $U_n$ is truncated to $R_n$ columns. All data in the mode matrix $U_n$ beyond the $R_n$ column can be removed from the matrix $U_n$. After the matrix $U_n$ is truncated, the procedure step 824 advances to step 1106, in which it is determined whether the index n is equal to N. If that is the case, the procedure step 824 advances to step 1110; otherwise, the procedure step 824 is forwarded to step 1108. In step 1108, the index n is incremented by one (1), and the procedure step 824 proceeds to step 1104. Then, in step 1110, the index n is initialized to one (1), and the procedure step 824 advances to step 1112, in which the tensor is calculated $\tilde{U}_n^{k+1} = D \times_2 U_2^{k^T} \times_3 U_3^{k^T} \ldots \times_N U_N^{k^T}$. When the tensor $U'_n{}^{k+1}$ is calculated, the procedure step 824 advances to step 1114, in which the tensor $U'_n{}^{k+1}$ is mode-n flattened to obtain the matrix $U'_{n(n)}{}^{k+1}$. Then in step 1116, the matrix $U'_1{}^{k+1}$ is computed as the $I_1 \times R_1$ matrix whose columns are the first $R_1$ columns of the left matrix of the SVD of $U'_{1(1)}{}^{k+1}$.

In step 1118, it is determined whether the index n is equal to N. If that is the case, the procedure step 824 advances to step 1122; otherwise the procedure step 824 advances to step 1120, in which the index n is incremented by one (1) and the procedure step 824 advances to step 1112. Then in step 1122, it is determined whether the mode matrices have converged. The mode matrices have converged if $\|U_n^{k+1^T} U_n^k\|^2 > (1-\epsilon) R_n$, for $1 \leq n \leq N$. If the mode matrices have converged, the procedure step 824 advances to step 1124; otherwise the procedure step 824 advances to step 1110. In step 1124, the core tensor Z' is computed. The converged mode matrices $U'_1, U'_2, \ldots, U'_N$ is used to compute the core tensor $Z'=U'^N\times_N U'_N{}^T$ and $D'=Z'\times_1 U'_1 \times_2 U'_2 \ldots \times_N U'_N$ as the rank-reduced approximation of the tensor D. Once the core tensor Z' is computed, the procedure step 824 is completed.

C. Motion Signature Using a Matrix Representation of a Corpus of Data

Figure 13:
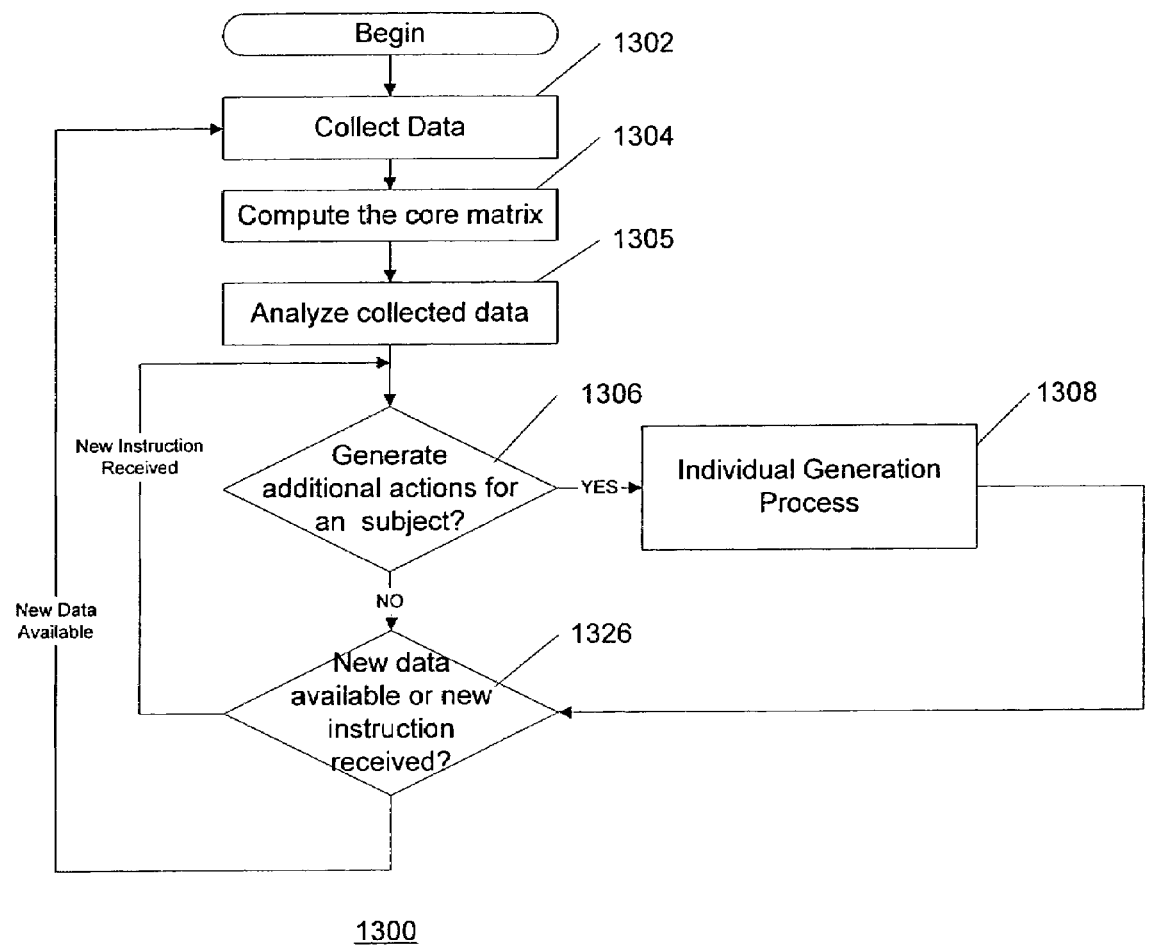
FIG. 13 is a flow diagram of another exemplary embodiment of a process according to the present invention which analyzes multilinear data.

FIG. 13 illustrates a flow diagram of an exemplary embodiment of a process implementing a multilinear data analysis application 1300 which is indicative of the multilinear data analysis application. As described above for the multilinear data analysis application, the process 1300 is configured to synthesize a known action never before recorded as being performed by the subject. In particular the multilinear data analysis application utilizes the corpus of motion data, which is collected using the data capturing system 112 from different subjects as described above in relation to FIG. 2. This corpus of motion information is stored in the database 108 of the server 102, and describes angles of the joints in the legs of at least one subject performing at least one action. The corpus of motion information can be organized as a matrix D and is preferably collected from different subjects as described above in relation to FIG. 2. It should be understood that the corpus of motion information can also be organized as a tensor D or a vector d. The multilinear data analysis application 1300 is similar to the multilinear data analysis application 200 of FIG. 2, except that the data utilized by the multilinear data analysis application 1300 takes is organized as the matrix D, not as the tensor D.

Turning to further particulars of FIG. 13, in step 1302, the process 1300 collects motion information or data on various subjects (e.g., people) performing different actions, e.g., new motion data. If the action and individual are known, the data can be integrated into the matrix D. If the action or individual are not known, such data would likely not be integrated into the matrix D until those pieces of information are determined. The data describing an unknown action or individual is organized as a new data matrix $D_p$ or a new data vector d. The new data matrix $D_p$ can include more than one new data vector d. Each new data vector $d_{p,a}$ of the new data matrix $D_p$ describes the motion of subject p performing action a. With the knowledge of motion sequences of several subjects, the matrix D can take the form of a ntxm matrix, where n is the number of subjects, t is the number of joint angle time samples, and m is the number of motion classes. The first column of the matrix D stacks the mean walk of every subject, the second column stacks the mean ascending motion and the third stacks the mean stair descent, as follows:

$$D = \begin{bmatrix} D_1 \\ \vdots \\ D_i \\ \vdots \\ D_n \end{bmatrix} \quad D_i = \begin{bmatrix} \overrightarrow{walk_i} & \overrightarrow{ascend_i} & \overrightarrow{descend_i} \end{bmatrix}$$

The columns of the matrix $D_i$ are the average walk, ascend and descend of stairs of the $i^{th}$ subject. Each motion is defined as the angles by every joint over time.

At step 1304, the process 1300 decomposes the matrix D into a core matrix Z, a subject matrix P, and an action matrix A. The core matrix Z can be used for defining the inter-relationships between a subjects matrix P and an action matrix A. This step represents a singular value decomposition ("SVD") process 1304, shown in FIG. 14, and described in further detail herein. The SVD procedure of step 1304 is an orthonormal procedure that solves for the core matrix Z, the subject matrix P, and the action matrix A, which minimizes $$E = \|D - (Z^{VT}P^T)^{VT}A^T\| + \lambda_1\|P^TP - I\| + \lambda_2\|A^TA - I\|,$$

where I is the identity matrix. When this procedure of step 1304 determines the core matrix Z, the process 1300 advances to step 1305.

In step 1305, the process 1300 analyzes the data collected in the step 1302. The SVD procedure of step 1304 decomposes the matrix D into the product of a core matrix Z, and two orthogonal matrices as follows:

$$D = (Z^{VT}P^T)^{VT}A^T$$
$$= SA^T,$$

where the VT-operator is a matrix transpose T followed by a "vec" operator that creates a vector by stacking the columns of the matrix. The subject matrix $P=[p_1 \ldots p_n \ldots p_G]^T$, whose row vectors $p_i$ are person specific, encodes the invariancies across actions for each person. Thus, the subject matrix P contains the subject or human motion signatures $p_i$. The action matrix $$A = \begin{bmatrix} \cdot & \cdot & \cdot \\ \cdot & \cdot & \cdot \\ \cdot & \cdot & \cdot \\ \underbrace{}_{a_{walk}} & \underbrace{}_{a_{ascend}} & \underbrace{}_{a_{descend}} \end{bmatrix}^T$$

whose row vectors $a_c$, contain the coefficients for the different action classes c, encodes the invariancies across subjects for each action. The core matrix $Z=[Z_1 \ldots Z_i \ldots Z_n]^T$ represents the basis motions which are independent of people and of actions. It governs the relationship between the orthonormal matrices P and A. A matrix $$S=(Z^{VT}P^T)^{VT}=[S_1 \ldots S_i \ldots S_n]^T$$

is composed of person-specific signature matrices S.

In step 1306, the process 1300 determines whether it has been instructed by the client interface application to synthesize new data describing at least one known action that was never before recorded as being performed by a subject. If the process 1300 has received such instruction, step 1308 is executed to perform advances to an individual generation procedure, as shown in further detail in FIG. 15 and described herein. When the individual generation procedure of step 1308 is complete, the process 1300 advances to step 1326. Then in step 1326, the process 1300 determines whether a data set for a new subject should be integrated into the matrix D or if the client interface application has transmitted a new instruction. In particular, if the data set for a new subject performing the action is available, the process 1300 advances to step 1302. Otherwise, the process 1300 received the new instruction from the client interface application, so the process 1300 continues to step 1306.

Figure 14:
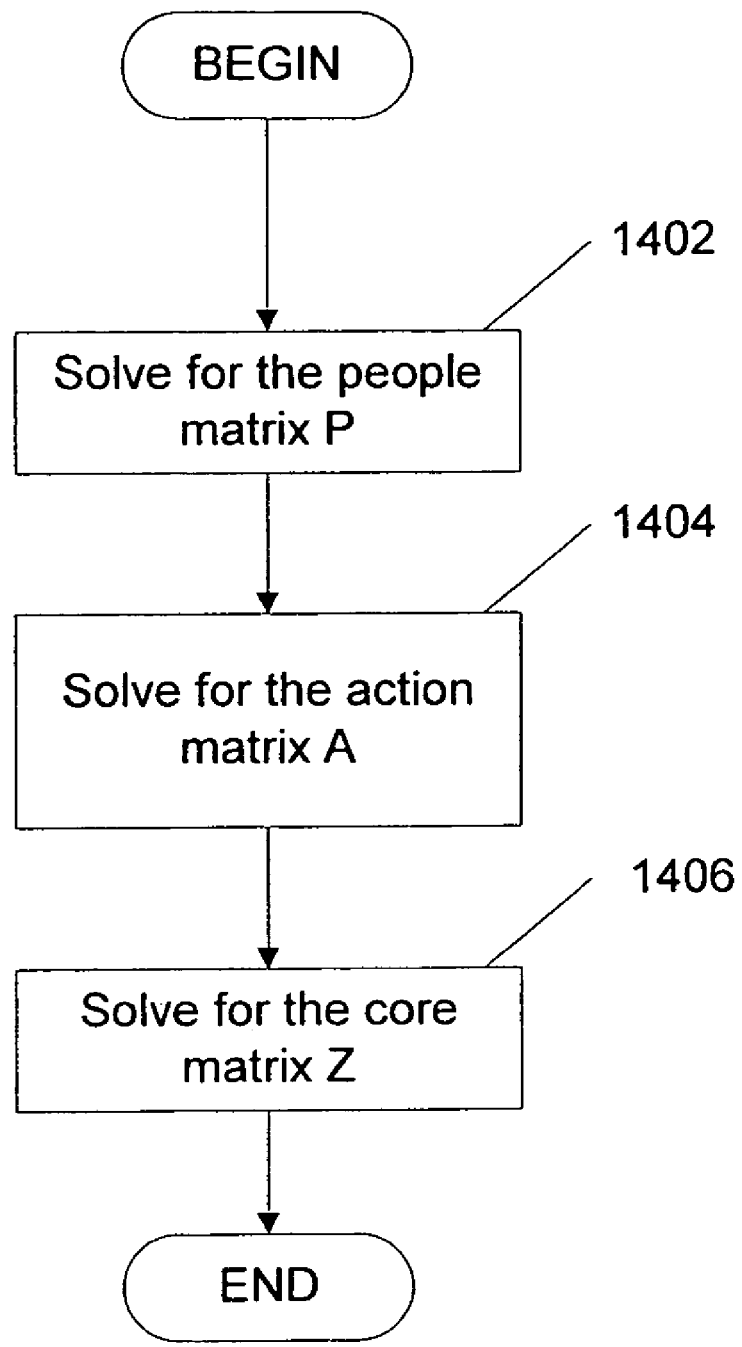
FIG. 14 is a flow diagram of an exemplary embodiment of a core matrix computation procedure of the process of FIG. 13 which performs an SVD matrix algorithm for decomposing a matrix.

As shown in FIG. 14, the procedure of step 1304 begins in step 1402 by computing the matrix P by solving $D=(Z^{VT}P^T)^{VT}A^T$. The process then calculates $(DA)^{VT}=Z^{VT}P^T$. The procedure performs an SVD procedure on the left hand side resulting in $USV^T=Z^{VT}P^T$. The matrix V is then truncated to the first r-columns of the matrix V. The procedure of step 1304 then solves for the action matrix A in step 1404 by calculating $D^{VT}=(ZA^T)^{VT}P^T$. Once this is calculated, the procedure calculates $(D^{VT}P)^{VT}=ZA^T$. The procedure performs SVD on the left hand side resulting in $USV^T=ZA^T$. The matrix A is then truncated to the first r-columns of the matrix V. In step 1406, the procedure of step 1304 obtains the core matrix Z by $Z=(D^{VT}P)^{VT}A$, where the matrix P and the matrix A are orthonormal. It should be understood that by setting the matrix A and the matrix P to the first r-columns of the matrix V, effectively accomplishing dimensional reduction.

Figure 15:
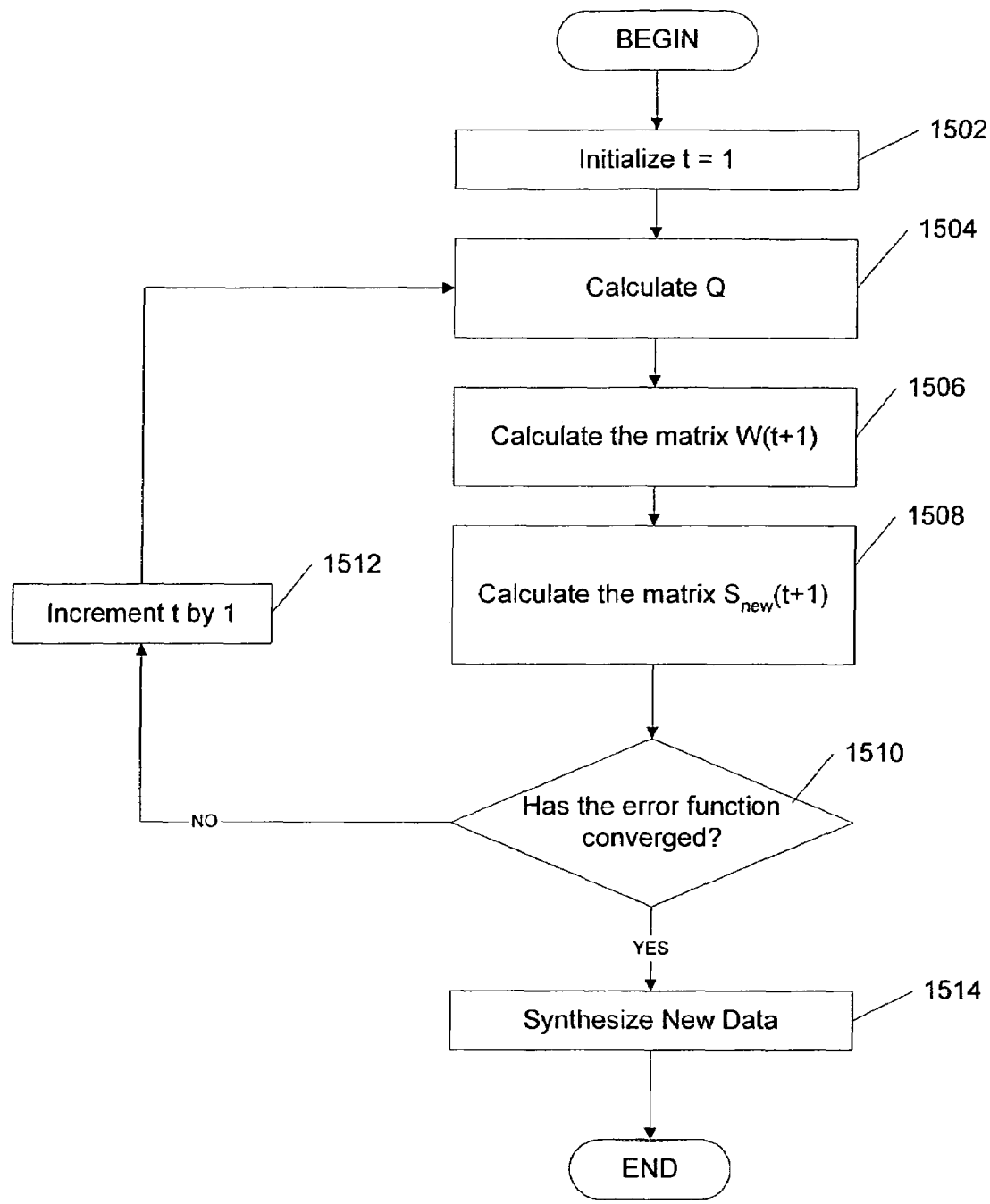
FIG. 15 is a flow diagram of an exemplary embodiment of a process of FIG. 13 which synthesizes the remaining actions for a new individual.

FIG. 15 illustrates the details of the individual generation procedure of step 1308, which synthesizes the remaining actions, which were never before seen, for an new individual. The remaining actions are generated given new motion data $D_{new}$ of the new subject performing an action. The new signature model of the new subject is the matrix $$D_{new} \begin{Bmatrix} [?] & | & | & \underline{[?]} \\ & & & S_{new} \end{Bmatrix} A^T.$$

Only a portion of the action classes c are represented the matrix $D_{new}$. The linear combination of known signatures is:

$$S_{new} = \underbrace{[W_1 \ldots W_i \ldots W_n]}_{W} \underbrace{\begin{bmatrix} S_1 \\ \vdots \\ S_i \\ \vdots \\ S_n \end{bmatrix}}_{S}$$

where W is a weight matrix. The individual generation procedure of step 1308 solves for the weight matrix W of the new subject using iterative gradient descent of the error function $$E=\|D_{new}-WSA_{inc}^T\|,$$

where $A_{inc}^T$ has only columns corresponding to the motion examples available in the matrix $D_{new}$. In particular, step 1502 of this procedure initializes an index t to one (1). In step 1504, the procedure of step 1308 obtains the matrix Q by calculating $Q=SA_{inc}^T$. Once this procedure obtains the matrix Q, step 1506 of the procedure of step 1308 calculates the matrix W(t+1) in the following manner: $W(t+1)=W(t)+\gamma(D_{new}-WQ)Q^T$. The step 1508 then calculates $S_{new}(t+1)$ by calculating $S_{new}(t+1)=W(t+1)S$, then this procedure advances to step 1510.

In step 1510, it is determined whether the error function E has converged. If the error function E has not converged, the procedure of step 1308 continues to step 1512, where the index t is incremented by one (1) and this procedure advances to step 1504. If the error function E has converged, this procedure advances to step 1514. In step 1514 the procedure of step 1308 synthesizes new data from one of the action parameters c. For example, if the action parameter c represents the action of walking. The new data for walking is synthesized by multiplying the newly extracted signature matrix $S_{new}$ and the action parameters for walking, $a_{walk}$, as follows:

$$\vec{walk}_{new} = S_{new} \vec{a}_{walk}.$$

Once the new data is synthesized, the procedure of step 1308 is complete and it exits.

While the invention has been described in connecting with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. It is intended that the specification and the described examples are considered as exemplary only, with the true scope and spirit of the invention indicated by the following claims.

What is claimed:

1. A computer-accessible medium which includes a computer program thereon, wherein, when the computer program is executed by a processing arrangement, the processing arrangement produces digital information comprising:
   a data structure having the digital information for an object descriptor of at least one object, comprising:
      a plurality of first data elements including information regarding at least one characteristic of the at least one object, wherein the information of the first data elements is capable of being used to obtain the object descriptor, wherein the object descriptor is related to the at least one characteristic and a further characteristic of the at least one object, and is capable of being used to generate a plurality of second data elements which contain information regarding the further characteristic of the at least one object based on the digital information for the object descriptor.

2. The computer-accessible medium of claim 1, wherein each of the at least one object is one of an identity of a person, an action performed by the person, and a joint angle.

3. The computer-accessible medium of claim 2, wherein the at least one characteristic of the at least one object is at least one of a walking motion, a climbing motion and a descending motion.

4. The computer-accessible medium of claim 1, wherein the at least one object is one of an identity of a person, a viewpoint, an illumination, an expression displayed by the person, and pixel.

5. The computer-accessible medium of claim 4, wherein the at least one characteristic of the at least one object is at least one of a smiling expression, a serious expression and a yawning expression.

6. The computer-accessible medium of claim 1, wherein the first data elements are defined by at least two primitives.

7. The computer-accessible medium of claim 6, wherein the primitives include at least one of an identity of a person, an action performed by the person, and a joint angle.

8. The computer-accessible medium of claim 6, wherein the primitives include at least one of an identity of a person, a viewpoint, an illumination, an expression displayed by the person, and pixel.

9. The computer-accessible medium of claim 6, wherein the first data elements form a tensor organized based on the primitives.

10. The computer-accessible medium of claim 1, wherein the second data elements are defined by at least two primitives.

11. The computer-accessible medium of claim 1, wherein the object descriptor is obtained using an n-mode orthonormal decomposition procedure.

12. The computer-accessible medium of claim 1, wherein the second data elements are generated using a generative model.

13. A computer-accessible medium which includes a computer program thereon, wherein, when the computer program is executed by a processing arrangement, the processing arrangement produces digital information comprising:
   a data structure configured to identify the digital data for a sample object based upon a sample object descriptor, the data structure comprising:
      a plurality of first data elements including information which is defined by at least two first primitives, wherein the first data elements are capable of being used to obtain at least one of a plurality of object descriptors; and
      a plurality of second data elements including information which is defined by at least two second primitives, wherein the second data elements are capable of being used to obtain the sample object descriptor, and wherein particular data for the at least one of the object descriptors are configured to be compared to the digital data for the sample object descriptor for determining whether the sample object descriptor is potentially identifiable as one of the object descriptors, wherein each of the plurality of object descriptors is associated with a respective one of a plurality of objects.

14. The computer-accessible medium of claim 13, wherein the sample object digital data is one of an identity of a person, an action performed by the person, and a joint angle.

15. The computer-accessible medium of claim 13, wherein each of the object digital data is one of an identity of a person, an action performed by the person, or a joint angle of a joint of a person.

16. The computer-accessible medium of claim 13, wherein each of the object digital data and the sample object are one of an identity of a person, a viewpoint, an illumination, an expression displayed by the person, or a pixel.

17. The computer-accessible medium of claim 13, wherein the first primitives include an identity of a person, an action performed by the person, and a joint angle of a joint of a person.

18. The computer-accessible medium of claim 13, wherein the first primitives include an identity of a person, a viewpoint, an illumination, an expression displayed by the person, and pixel.

19. The computer-accessible medium of claim 13, wherein the second primitives include an identity of a person, an action performed by the person, and a joint angle of a joint of a person.

20. The computer-accessible medium of claim 13, wherein the second primitives include an identity of a person, a viewpoint, an illumination, an expression displayed by the person, and pixel.

21. The computer-accessible medium of claim 13, wherein the first data elements form a tensor organized based on the first primitives.

22. The computer-accessible medium of claim 13, wherein the second data elements form a tensor organized based on the second primitives.

23. The computer-accessible medium of claim 13, wherein each of the object descriptors and the sample object descriptor are obtained using an n-mode single value decomposition procedure.

24. The computer-accessible medium of claim 13, wherein a magnitude of the sample object descriptor is compared to respective magnitudes of the object descriptors to determine whether the sample object digital data is potentially identifiable as one of the objects.

25. A method for generating digital information associated with an object descriptor of at least one object, comprising:
    collecting a plurality of first data elements which contain information regarding at least one characteristic of the at least one object;
    obtaining the object descriptor based on the information of the first data elements, wherein the object descriptor is related to first digital data for the at least one characteristic and second digital data for a further characteristic of the object; and
    generating a plurality of second digital data elements which contain information regarding the second digital data for the further characteristic of the at least one object based on the object descriptor.

26. The method of claim 25, wherein each of the at least one object is one of an identity of a person, an action performed by the person, and a joint angle.

27. The method of claim 25, wherein the at least one characteristic of the at least one object is at least one of a walking motion, a climbing motion and a descending motion.

28. The method of claim 25, wherein the at least one object is an identity of a person, a viewpoint, an illumination, an expression displayed by the person, and pixel.

29. The method of claim 25, wherein the at least one characteristic digital data of the at least one object is at least one of a smiling expression, a serious expression and a yawning expression.

30. The method of claim 25, wherein the first data elements are defined by at least two primitives.

31. The method of claim 30, wherein the primitives include at least one of an identity of a person, an action performed by the person, and a joint angle.

32. The method of claim 30, wherein the primitives include at least one of an identity of a person, a viewpoint, an illumination, an expression displayed by the person, and pixel.

33. The method of claim 30, wherein the first data elements form a tensor organized based on the primitives.

34. The method of claim 25, wherein the second data elements form a tensor organized based on at least two primitives.

35. The method of claim 25, wherein the object descriptor is obtained using an n-mode single value decomposition procedure.

36. The method of claim 25, wherein the second data elements are generated using a generative model.

37. A method for identifying a sample object based upon a sample object descriptor, comprising:
    collecting a plurality of data elements which are defined by at least two primitives;
    obtaining at least one of a plurality of object descriptors based on the information of the data elements; and
    comparing the sample object descriptor to at least one of the object descriptors for determining whether the sample object descriptor is identifiable as one of the object descriptors so as to generate digital data indicative of the comparison, wherein each of the object descriptors is associated with a respective one of a plurality of objects.

38. The method of claim 37, wherein the sample object is one of an identity of a person, an action performed by the person, and a joint angle.

39. The method of claim 37, wherein each of the objects is one of an identity of a person, an action performed by the person, and a joint angle.

40. The method of claim 37, wherein the sample object is one of an identity of a person, a viewpoint, an illumination, an expression displayed by the person, and pixel.

41. The method of claim 37, wherein each of the objects is one of an identity of a person, a viewpoint, an illumination, an expression displayed by the person, and pixel.

42. The method of claim 37, wherein the primitives include at least one of an identity of a person, an action performed by the person, and a joint angle.

43. The method of claim 37, wherein the primitives include at least one of an identity of a person, a viewpoint, an illumination, an expression displayed by the person, and pixel.

44. The method of claim 37, wherein the data elements form a tensor organized based on the primitives.

45. The method of claim 37, further comprising generating a plurality of further data elements describing digital data for a particular characteristic of the sample object, wherein the further data elements are defined by at least two primitives.

46. The method of claim 37, wherein the obtaining step comprises extracting each of the sample object descriptor using an n-mode single value decomposition procedure.

47. The method of claim 37, wherein the obtaining step comprises extracting at least one of the plurality of object descriptors using an n-mode single value decomposition procedure.

48. The method of claim 37, wherein the comparing step comprises comparing a magnitude of the sample object descriptor to magnitudes of the object descriptors to determine whether the sample object is potentially identifiable as one of first and second ones of the objects.

49. A storage medium providing thereon a computer program that is adapted for generating an object descriptor of at least one object, wherein, when the computer program is executed by a processing arrangement, the processing arrangement executes one or more procedures comprising of:

collecting a plurality of first data elements which contain information regarding at least one characteristic of the at least one object;

obtaining the object descriptor based on the information of the first data elements, wherein the object descriptor is related to first digital data for the at least one characteristic and second digital data for a further characteristic of the object; and generating a plurality of second data elements which contain information regarding the second digital data for the further characteristic of the at least one object based on the object descriptor.

50. The storage medium of claim 49, wherein each of the at least one object is one of an identity of a person, an action performed by the person, and a joint angle.

51. The storage medium of claim 49, wherein the first digital data for the at least one characteristic of the at least one object is at least one of a walking motion, a climbing motion or a descending motion.

52. The storage medium of claim 49, wherein the at least one object is an identity of a person, a viewpoint, an illumination, an expression displayed by the person, and pixel.

53. The storage medium of claim 49, wherein the first digital data for the at least one characteristic of the object is at least one of a smiling expression, a serious expression or a yawning expression.

54. The storage medium of claim 49, wherein the first data elements are defined by at least two primitives.

55. The storage medium of claim 54, wherein the primitives include at least one of an identity of a person, an action performed by the person, and a joint angle.

56. The storage medium of claim 54, wherein the primitives include at least one of an identity of a person, a viewpoint, an illumination, an expression displayed by the person, and pixel.

57. The storage medium of claim 54, wherein the first data elements form a tensor organized based on the primitives.

58. The storage medium of claim 49, wherein the second data elements form a tensor based on at least two primitives.

59. The storage medium of claim 49, wherein the object descriptor is obtained using an n-mode single value decomposition procedure.

60. The storage medium of claim 49, wherein the second data elements are generated using a generative model.

61. A storage medium providing thereon a computer program that is adapted for generating an object descriptor of at least one object, wherein, when the computer program is executed by a processing arrangement, the processing arrangement executes one or more procedures comprising of:

collecting a plurality of data elements which are defined by at least two primitives;

obtaining at least one of a plurality of object descriptors based on the information of the data elements; and comparing the sample object descriptor to at least one of the object descriptors for determining whether the sample object descriptor is identifiable as one of the object descriptors so as to generate digital data indicative of the comparison, wherein each of the object descriptors is associated with a respective one of a plurality of objects.

62. The storage medium of claim 61, wherein the sample object is one of an identity of a person, an action performed by the person, and a joint angle.

63. The storage medium of claim 61, wherein each of the objects is one of an identity of a person, an action performed by the person, and a joint angle.

64. The storage medium of claim 61, wherein the sample object is one of an identity of a person, a viewpoint, an illumination, an expression displayed by the person, and pixel.

65. The storage medium of claim 61, wherein each of the objects is one of an identity of a person, a viewpoint, an illumination, an expression displayed by the person, and pixel.

66. The storage medium of claim 61, wherein the primitives include at least one of an identity of a person, an action performed by the person, and a joint angle.

67. The storage medium of claim 61, wherein the primitives include at least one of an identity of a person, a viewpoint, an illumination, an expression displayed by the person, and pixel.

68. The storage medium of claim 61, wherein the data elements form a tensor organized based on the primitives.

69. The storage medium of claim 61, wherein the processing arrangement executes one or more procedures further comprising of generating a plurality of further digital data elements describing a further characteristic of the sample object, wherein the further data elements are defined by at least two further primitives.

70. The storage medium of claim 69, wherein the further primitives and the primitives are the same.

71. The storage medium of claim 61, wherein the obtaining procedure comprises extracting each of the sample object descriptor and at least one of the plurality of object descriptors using an n-mode single value decomposition procedure.

72. The storage medium of claim 61, wherein the comparing procedure comprises comparing a magnitude of the sample object descriptor to magnitudes of the object descriptors to determine whether the sample object is potentially identifiable as one of first and second ones of the objects.

73. A computer-accessible medium which includes a computer program thereon, wherein, when the computer program is executed by a processing arrangement, the processing arrangement produces digital information comprising:

a data structure providing the digital information for at least two object descriptors, the data structure comprising: a plurality of data elements including information defined by at least two primitives, wherein the data elements are capable of being used to obtain at least one of the digital information for the object descriptors, wherein the at least one of the object descriptors is capable having a reduced dimensionality.

74. The computer-accessible medium of claim 73, wherein each of the object descriptors except for the one of the object descriptors having the reduced dimensionality maintain full dimensionality.

75. The computer-accessible medium of claim 73, wherein the primitives include at least one of an identity of a person, an action performed by the person, or a joint angle.

76. The computer-accessible medium of claim 73, wherein the primitives include at least one of an identity of a person, a viewpoint, an illumination, an expression displayed by the person, or a pixel.

77. The computer-accessible medium of claim 73, wherein each of the object descriptors is associated with a respective one of a plurality of objects.

78. The computer-accessible medium of claim 73, wherein the data elements form a tensor organized based on the primitives.

79. The computer-accessible medium of claim 73, wherein the digital information for the one of the at least two object descriptors is obtained using an n-mode single value decomposition procedure.

80. The computer-accessible medium of claim 73, wherein the dimensionality of the digital information for the one of the object descriptors is reduced using an n-mode orthogonal iteration procedure.

81. A method for reducing a dimensionality of one of at least two object descriptors and generating digital information based on the reduction, comprising:
  collecting first digital data associated with a plurality of data elements which are defined by at least two primitives;
  obtaining second digital data associated with the one of the object descriptors based on the first digital data; and
  reducing the dimensionality of the one of the object descriptors to generate the digital information.

82. The method of claim 81, wherein each of the object descriptors except for the one of the object descriptors having the reduced dimensionality maintain a full dimensionality.

83. The method of claim 81, wherein the primitives include at least one of an identity of a person, an action performed by the person, or a joint angle.

84. The method of claim 81, wherein the primitives include at least one of an identity of a person, a viewpoint, an illumination, an expression displayed by the person, or a pixel.

85. The method of claim 81, wherein each of the object descriptors is associated with a respective one of a plurality of objects.

86. The method of claim 81, wherein the data elements form a tensor organized based on the primitives.

87. The method of claim 81, wherein the second digital data associated with the one of the at least two object descriptors is obtained using an n-mode single value decomposition procedure.

88. The method of claim 81, wherein the dimensionality of the one of the object descriptors is reduced using an n-mode orthogonal iteration procedure.

89. A storage medium providing thereon a computer program for reducing a dimensionality of one of at least two object descriptors to generate digital information, wherein, when executed by a processing arrangement, the computer program configures the processing arrangement to execute the procedures comprising of:
  collecting first digital data associated with a plurality of data elements which are defined by at least two primitives;
  obtaining second digital data associated with the one of the object descriptors based on the first digital data; and
  reducing the dimensionality of the one of the object descriptors to generate the digital information.

90. The storage medium of claim 89, wherein each of the object descriptors except for the one of the object descriptors having the reduced dimensionality maintain a full dimensionality.

91. The storage medium of claim 89, wherein the primitives include at least one of an identity of a person, an action performed by the person, or a joint angle.

92. The storage medium of claim 89, wherein the primitives include at least one of an identity of a person, a viewpoint, an illumination, an expression displayed by the person, or a pixel.

93. The storage medium of claim 89, wherein each of the object descriptors is associated with a respective one of a plurality of objects.

94. The storage medium of claim 89, wherein the data elements form a tensor organized based on the primitives.

95. The storage medium of claim 89, wherein the second digital data associated with the one of the at least two object descriptors is obtained using an n-mode single value decomposition procedure.

96. The storage medium of claim 89, wherein the dimensionality of the one of the object descriptors is reduced using an n-mode orthogonal iteration procedure to provide the digital information.

97. A computer program for generating digital information associated with an object descriptor of at least one object, wherein the computer program is configured to be provided on a computer-accessible medium and executed by a processing arrangement to perform the procedures comprising of:
  collecting a plurality of first data elements which contain information regarding at least one characteristic of the at least one object;
  obtaining the object descriptor based on the information of the first data elements, wherein the object descriptor is related to first digital data for the at least one characteristic and second digital data for a further characteristic of the object; and
  generating a plurality of second digital data elements which contain information regarding the second digital data for the further characteristic of the at least one object based on the object descriptor.

98. The computer program of claim 97, wherein each of the at least one object is one of an identity of a person, an action performed by the person, and a joint angle.

99. The computer program of claim 97, wherein the at least one characteristic of the at least one object is at least one of a walking motion, a climbing motion or a descending motion.

100. The computer program arrangement of claim 97, wherein the at least one object is an identity of a person, a viewpoint, an illumination, an expression displayed by the person, or a pixel.

101. A computer program for identifying a sample object based upon a sample object descriptor, wherein the computer program is configured to be provided on a computer-accessible medium and executed by a processing arrangement to perform the procedures comprising of:
  collecting a plurality of data elements which are defined by at least two primitives;
  obtaining at least one of a plurality of object descriptors based on the information of the data elements; and
  comparing the sample object descriptor to at least one of object descriptors for determining whether the sample object descriptor is identifiable as one of the object descriptors so as to generate digital data indicative of the comparison, wherein each of the object descriptors is associated with a respective one of a plurality of objects.

102. The computer program of claim 101, wherein the primitives include at least one of an identity of a person, an action performed by the person, or a joint angle.

103. The computer program of claim 101, wherein the primitives include at least one of an identity of a person, a viewpoint, an illumination, an expression displayed by the person, or a pixel.

104. The computer program of claim 101, wherein the data elements form a tensor organized based on the primitives.

105. The computer program of claim 101, wherein the processing arrangement is configured to further execute the procedure comprising of generating a plurality of further data elements describing a further characteristic of the sample object, wherein the further data elements are defined by at least two primitives.

106. A computer program for reducing a dimensionality of one of at least two object descriptors and generating digital information based on the reduction, wherein the computer program is configured to be provided on a computer-accessible medium and executed by a processing arrangement to perform the procedures comprising of:
collecting first digital data associated with a plurality of data elements which are defined by at least two primitives;
obtaining second digital data associated with the one of the object descriptors based on the first digital data; and
reducing the dimensionality of the one of the object descriptors to generate the digital information.

107. The computer program of claim 106, wherein each of the object descriptors except for the one of the object descriptors having the reduced dimensionality maintain a full dimensionality.

108. The computer program of claim 106, wherein the primitives include at least one of an identity of a person, an action performed by the person, or a joint angle.

109. The computer program of claim 106, wherein the primitives include at least one of an identity of a person, a viewpoint, an illumination, an expression displayed by the person, or a pixel.

110. The computer program of claim 106, wherein the dimensionality of the one of the object descriptors is reduced using an n-mode orthogonal iteration procedure so as to generate the digital information.

111. A computer-accessible medium which includes a computer program thereon, wherein, when the computer program is executed by a processing arrangement, the processing arrangement produces digital information comprising:
a data structure configured to generate an object descriptor, comprising:
a plurality of data elements which are defined by at least two primitives, wherein the information of the data elements is configured to be used to obtain the digital information for the object descriptor using an orthonormal decomposition procedure.

112. The computer-accessible medium of claim 111, wherein the data elements form a tensor organized based on the primitives, and wherein the tensor has a fixed order.

113. The computer-accessible medium of claim 112, wherein the n-mode orthonormal decomposition procedure is an n-mode singular value decomposition procedure.

114. The computer-accessible medium of claim 113, wherein the n-mode singular value decomposition procedure is capable of decomposing the tensor into a core tensor and at least two orthonormal matrices.

115. The computer-accessible medium of claim 111, wherein each of the primatives is one of an identity of a person, an action performed by the person, and a joint angle.

116. The computer-accessible medium of claim 111, wherein each of the primatives is one of an identity of a person, a viewpoint, an illumination, an expression displayed by the person, and pixel.

117. A method for generating the digital information for an object descriptor, comprising:
collecting a plurality of data elements which are defined by at least two primitives; and
obtaining the object descriptor based on the information of the data elements using an n-mode orthonormal decomposition process so as to generate the digital information.

118. The method of claim 117, wherein the data elements form a tensor organized based on the primitives, and wherein the tensor has a fixed order.

119. The method of claim 118, wherein the n-mode orthonormal decomposition procedure is an n-mode singular value decomposition procedure.

120. The method of claim 119, wherein the n-mode singular value decomposition procedure is capable of decomposing the tensor into a core tensor and at least two orthonormal matrices.

121. The method of claim 117, wherein each of the primatives is one of an identity of a person, an action performed by the person, and a joint angle.

122. The method of claim 117, wherein each of the primatives is one of an identity of a person, a viewpoint, an illumination, an expression displayed by the person, or a pixel.

123. A storage medium providing thereon a computer program that is adapted for generating the digital information for an object descriptor, wherein, when executed by a processing arrangement, the computer program configures the processing arrangement to execute the procedures comprising of:
collecting a plurality of data elements which are defined by at least two primitives; and
obtaining the object descriptor based on the information of the data elements using an n-mode orthonormal decomposition process so as to generate the digital information.

124. The storage medium of claim 123, wherein the data elements form a tensor organized based on the primitives, and wherein the tensor has a fixed order.

125. The storage medium of claim 124, wherein the n-mode orthonormal decomposition procedure is an n-mode singular value decomposition procedure.

126. The storage medium of claim 125, wherein the n-mode singular value decomposition procedure is capable of decomposing the tensor into a core tensor and at least two orthonormal matrices.

127. The storage medium of claim 123, wherein each of the primatives is one of an identity of a person, an action performed by the person, or a joint angle.

128. The storage medium of claim 123, wherein each of the primatives is one of an identity of a person, a viewpoint, an illumination, an expression displayed by the person, or a pixel.

129. A computer program for generating the digital information for an object descriptor, wherein the computer program is configured to be provided on a computer-accessible medium and executed by a processing arrangement to perform the procedures comprising of:
collecting a plurality of data elements which are defined by at least two primitives; and obtaining the object descriptor based on the information of the data elements using an n-mode orthonormal decomposition process so as to generate the digital information.

130. The computer program of claim 129, wherein the data elements form a tensor organized based on the primitives, and wherein the tensor has a fixed order.

131. The computer program of claim 130, wherein the n-mode orthonormal decomposition procedure is an n-mode singular value decomposition procedure.

132. The computer program of claim 131, wherein the n-mode singular value decomposition procedure is capable of decomposing the tensor into a core tensor and at least two orthonormal matrices.

133. The computer program of claim 129, wherein each of the primitives is one of an identity of a person, an action performed by the person, or a joint angle.

134. The computer program of claim 129, wherein each of the primitives is one of an identity of a person, a viewpoint, an illumination, an expression displayed by the person, or a pixel.

135. A method for collecting information and generating digital information based on the collection, comprising:

collecting a plurality of data elements which are defined by at least two primitives; forming at least one first tensor based on the data elements that are organized using the primitives having known values; and forming at least one second tensor based on the data elements that are organized using the primatives having unknown values so as to generate the digital information.

136. The method of claim 134, wherein each of the primatives is one of an identity of a person, an action performed by the person, or a joint angle.

137. The method of claim 135, wherein each of the primatives is one of an identity of a person, a viewpoint, an illumination, an expression displayed by the person, or a pixel.

* * * * *